United States Patent [19]

Gurd et al.

[11] Patent Number: 4,989,136
[45] Date of Patent: Jan. 29, 1991

[54] DELAY MANAGEMENT METHOD AND DEVICE

[75] Inventors: John R. Gurd, Manchester, United Kingdom; Katsura Kawakami, Yokohamasi Kanagawaken, Japan

[73] Assignees: The Victoria University of Manchester, Manchester, England; Matsushita Electrical Industrial Co., Ltd., Osaka, Japan

[21] Appl. No.: 56,475

[22] Filed: May 28, 1987

[30] Foreign Application Priority Data

May 29, 1986 [GB] United Kingdom ............... 8613068

[51] Int. Cl.$^5$ .......................... G06F 3/00; H04J 3/24
[52] U.S. Cl. .......................... 364/200; 364/271.5; 364/263.1; 364/269; 364/231.8; 364/944.92; 364/945.9; 364/948.3; 364/942.1
[58] Field of Search ... 364/200 MS File, 900 MS File

[56] References Cited

U.S. PATENT DOCUMENTS

| 3,736,566 | 5/1973 | Anderson et al. | 364/200 |
| 4,149,245 | 4/1979 | Gannon et al. | 364/200 |
| 4,385,365 | 5/1983 | Hashimoto | 364/900 |
| 4,426,681 | 1/1984 | Bacot et al. | 364/200 |

*Primary Examiner*—Michael R. Fleming
*Assistant Examiner*—Christopher B. Shin
*Attorney, Agent, or Firm*—Spensley, Horn, Jubas & Lubitz

[57] ABSTRACT

A delay management method and device in which, when a data read request is made relating to data which has not yet reached a memory section, that read request is delayed and sent to a delay management section. The read request data is sent to a free address in the delay management section selected from a store of free addresses in the memory section. The delay management section stores the read request data at the free address. The delay management section communicates free addresses to the memory section.

5 Claims, 25 Drawing Sheets

DELAY MANAGEMENT METHOD AND DEVICE

BACKGROUND OF THE INVENTION

1. Field of the Invention

The present invention relates to a delay management method and device which in an electronic computer enables read requests relating to data not yet stored in the computer memory to be delayed.

2. Description of Related Art

In an electronic computer, such as a microcomputer, when it is desired to access data stored in a memory device of the computer, a read request is made which indicates the specific memory addresses in which the data is stored. The stored data is then read out and processed as required. In existing serial processing computers it is not generally possible to access data which is not stored in the memory. In serial processing computers in which program commands are executed in individual independent devices, there are times when read requests are made which relate to data which has not yet reached the memory, and it is necessary to have a mechanism whereby the read request is delayed until the required data has reached the memory.

FIGS. 1a and 1b schematically illustrate a system incorporating such a delay management device, the system comprising a processing device and a memory device which has a facility to delay read requests (hereinafter referred to simply as a "read delay device"). A read delay device 100 is illustrated in FIG. 1a, the read delay device comprising a distribution (allocation) section 100a, a memory section 100b, a delay (defer) management section 100c and a clear control section 100d. Channels 101 and 102 are provided for sending information from processing device 103 to the read delay device 100 and from the read delay device 100 to the processing device 103 respectively.

The exchange of information between the processing device 103 and the read delay device 100 comprises the sending of a single data packet (herein referred to as a "token"). When the distribution section 100a receives a space request (SRQ) token 104 from the processing device 103 it returns a space provided (SP) token 107 comprising an address for the requested space. The memory section 100b also receives a write (WRT) token 105 and a read request (READ) token 106, in response to the former it enters a parameter V into an address A, and in response to the latter it reads the contents V of address A and sends the read data to the processing device 103 in the form of a data (DT) token 108. The significance of the data sent back is indicated by parameter Ra. Delay management section 100c and clear control section 100d do not communicate tokens directly to the processing device 103. Delay management section 100c manages read request tokens which relate to data which has not yet arrived in the memory section 100b, and clear control section 100d clears memory areas which are no longer required. Each token is distinguished from the others by a code which forms a part of that token.

FIG. 1b shows the form of each token. The token forms identified by numerals 464 to 468 correspond to tokens 104 to 108 respectively in FIG. 1a.

It can be seen from FIG. 1b that each token comprises four fields, namely a first code field 451, a second code field 452, a third code field 453, and a fourth code field 454.

Code field 451 serves the purpose of distinguishing between the different kinds of tokens. In the example of FIG. 1b field 451 is allotted four bits, which can designate sixteen different kinds of token. For the sake of simplicity in the example shown the second, third and fourth fields 452 to 454 each have twenty four bits, but any number of bits can be allocated to each field depending on the requirements of the system. The shaded parts of the diagrams show fields which are not used in the tokens to which the diagrams relate.

FIGS. 2a, 2b and 2c serve to explain in detail the workings of memory section 100b and the delay management section 100c. In FIG. 2a numeral 100b denotes the memory section, and 201 and 202 are the entry and exit channels respectively of tokens going in and out of memory section 100b. The words inside memory section 100b contain a "flag field" and a "data field". The flag field of address A comprises a valid flag (P) 203 which shows whether or not there is any significant data in the data field and delay flag (D) 204 which shows whether or not a read request delay has occurred. That is to say when an entry has been made in the data field by the entry of data, the token valid flag 203 becomes "1", and when this entry is cancelled, the flag 203 becomes "0". When the read request token is delayed, delay flag 204 becomes "1". In a memory device such as 100b of FIG. 1a, as shown in FIG. 2a when a read request token 206 which corresponds to a particular address A arrives, the action of memory section 100b depends upon the condition of the valid flag in address A.

That is to say:

(1) When the valid flag is "1" then as shown in FIG. 2b, the data V stored in the data section of address A is read, entered into the token having the parameter Ra, and sent as the data token 207.

(2) When the existing flag is "0" then the data intended for address A has not yet arrived, and the read request must therefore be stored. Referring to FIG. 2c, the read request token is stored in the field 207 (for example address Q) at the discretion of the delay management section 100c. For the sake of economic use of memory space, the read address parameter A is deleted and stored, but this deletion is in practice essentially not necessary. In these situations the information which shows that there is a first delay token in address A (shown by an asterisk in the drawings) is shown in a linking field 208. In the data field of address A in respect of which the delay has occurred the read request token store address pointer Q is stored. "1" is entered in the delay flag 204.

In this device many read request tokens can arrive which relate to the same address A of the memory section 100b. Therefore many tokens may be delayed relating to the same address, and as is shown in FIG. 3a the delayed tokens are stored in a series. Referring to FIGS. 3a and 3b, numerals 301 to 305 identify corresponding items to those identified by numerals 201 to 205 in FIGS. 2a to 2c. The series of fields stored in the delay management section 100c are used in the form of delay tokens. Thus when the write token 307 corresponding to the address A arrives, the series of delay tokens which are waiting for data to be entered in address A are all released as shown in FIG. 3b. When the token 307 arrives, the data V is entered in the data field of address A, and at the same time "1" is entered in valid flag 303 and "0" is entered in delay flag 304. The data V which is being entered in each address in the delay chain are correlated and data tokens 308 to 310 are formed and sent to the processing device. The addresses Q1 to Q3 which previously were used to store the delay tokens become free and can be used during subsequent delay processing.

In the above mentioned process it is not possible to manage new read request and write commands whilst managing the series of delay tokens, and this causes the process to be rather slow. This problem cannot be solved merely by separating the memory section 100b and the delay management section 100c and applying the process explained with reference to FIGS. 2a to 2c. Such a separation is illustrated in FIGS. 4a and 4b. With such an arrangement it is possible to have a memory section 100b and a delay management section 100c operating in parallel, but this poses problems of its own. These problems will be explained with reference to FIGS. 4a to 4e.

Numerals 401 to 404 in FIGS. 4a to 4e correspond to numerals 301 to 304 in FIGS. 3a and 3b, and indicate corresponding functions. Channels 409 and 410 carry tokens going from delay management section 100c to memory section 100b and from memory section 100b to delay management section 100c respectively. Referring to FIG. 4a, two read request tokens are shown as having been previously delayed. A further read request token 411 then arrives related to address A. In these circumstances the action of each part of the system is as described hereinbelow:

(1) Data has not yet been entered into address A, and thus the valid flag 403 of address A is "0". The read request token 411 must be delayed, and referring to FIG. 4b, it becomes delay token DREAD 412 and is sent to delay section 100c. At this time the parameter of address A is the leading address Q2 of the series of delay tokens which is maintained relating to address A.

(2) Referring to FIG. 4c, when the delay token 412 arrives at delay management device 100c, the token 412 is housed in an appropriate free address (for example Q3), and at the same time a new leading address token (NQA) 413 is output to memory device 100b. The token 413 has the purpose of delivering the new leading address Q3 of the series of delay tokens to the memory device 100b.

The new tokens DREAD and NQA which have appeared as described above are shown in FIG. 4f. Fields 751 to 754 in FIG. 4f correspond to fields 451 to 454 in FIG. 1b. The shaded sections of the diagram are fields which are not used.

Let us assume that token 413 arrives at memory section 100b at the same time as a new read request token 414 related to address A.

(3) If the token 413 arrives before token 414, the memory device 100b enters parameter Q3 into address A which is designated by token 413. Referring to FIG. 4d the pointer from address A designates the first token in the series, and token delay management is completed normally.

(4) If the token 413 arrives after token 414, then referring to FIG. 4e, token 414 is delayed and becomes token 411, and the parameter of delayed token 411 becomes the above new value Q2. Even if the token 411 is stored in delay management section 100c, two tokens are associated with the address Q2, and the delay tokens do not therefore form the normal series of single tokens.

It is an object of the present invention to obviate or mitigate the above-mentioned disadvantages of the prior art and make it possible to manage the operation of the memory device and the delay management device effectively.

SUMMARY OF THE INVENTION

According to the present invention, there is provided a delay management method for delaying read request instructions which relate to data not yet stored in a memory section of a computer, wherein a delay management section of the computer sends to the memory section data identifying free addresses within the delay management section, the free address data is stored in the memory section, the memory section detects when a read request is received relating to an address of the memory section to which data has not yet been written, when such a read request is detected the memory section sends data to the delay management section identifying the read request to be delayed and a free address taken from the addresses stored in the memory section, the free address sent to the delay management section is cancelled from the addresses stored in the memory section, the delay management section stores the read request data received from the memory section at the free address identified by the received data, when data is written to the address of the memory section to which the delayed read request relates, a release request is sent by the memory section to the delay management section, the delay management section responds to the release request sending the delayed read request to the memory section, and the delay management section sends data to the memory section indicating that the address from which the read request has been released is again a read address.

The invention also provides a delay management device for delaying read request instructions which relates to data not yet stored in a memory section of a computer, comprising management section, means for identifying free addresses in the delay management section, means for communicating free addresses from the delay management section to the memory section, means in the memory section for storing data identifying the free addresses, means for detecting a read request to be delayed which relates to an address of the memory section to which data has not yet been written, means for sending data to the delay management section identifying a detected read request which is to be delayed and a selected free address taken from the free address storing means, means for cancelling the selected free address from the free address storing means, means for storing the read request received from the memory section at the selected free address of the delay management section, means for detecting the writing of data to the said address of the memory section, means for generating a release request when the writing of data to the said address is detected, means for communicating the release request to the delay management section, means responsive to the release request to generate the delayed read request, means for communicating the generated delayed read request to the memory section, means for detecting clearance of a selected free address, and means for communicating the cleared selected address to the memory section for storage in the free address storing means.

As mentioned above, the object of the present invention is, when a read request is made for data which has not yet arrived in the memory device, the memory device sends to the delay management section not only free address information which has previously been received from the delay management section, but also data relating to the read request which is to be delayed, the delay management section storing the read request data in the free address identified by the information sent with the read request data.

BRIEF DESCRIPTION OF THE DRAWINGS

An example of the present invention will now be described with reference to the accompanying drawings. In the drawings:

FIG. 1b is a schematic diagram illustrating the form of tokens used in the device of FIG. 1a;

DESCRIPTION OF THE PREFERRED EMBODIMENTS

The present invention will now be described by way of example with reference to FIGS. 5, 6 and 7a to 7j of the accompanying drawings.

Figure 1A:
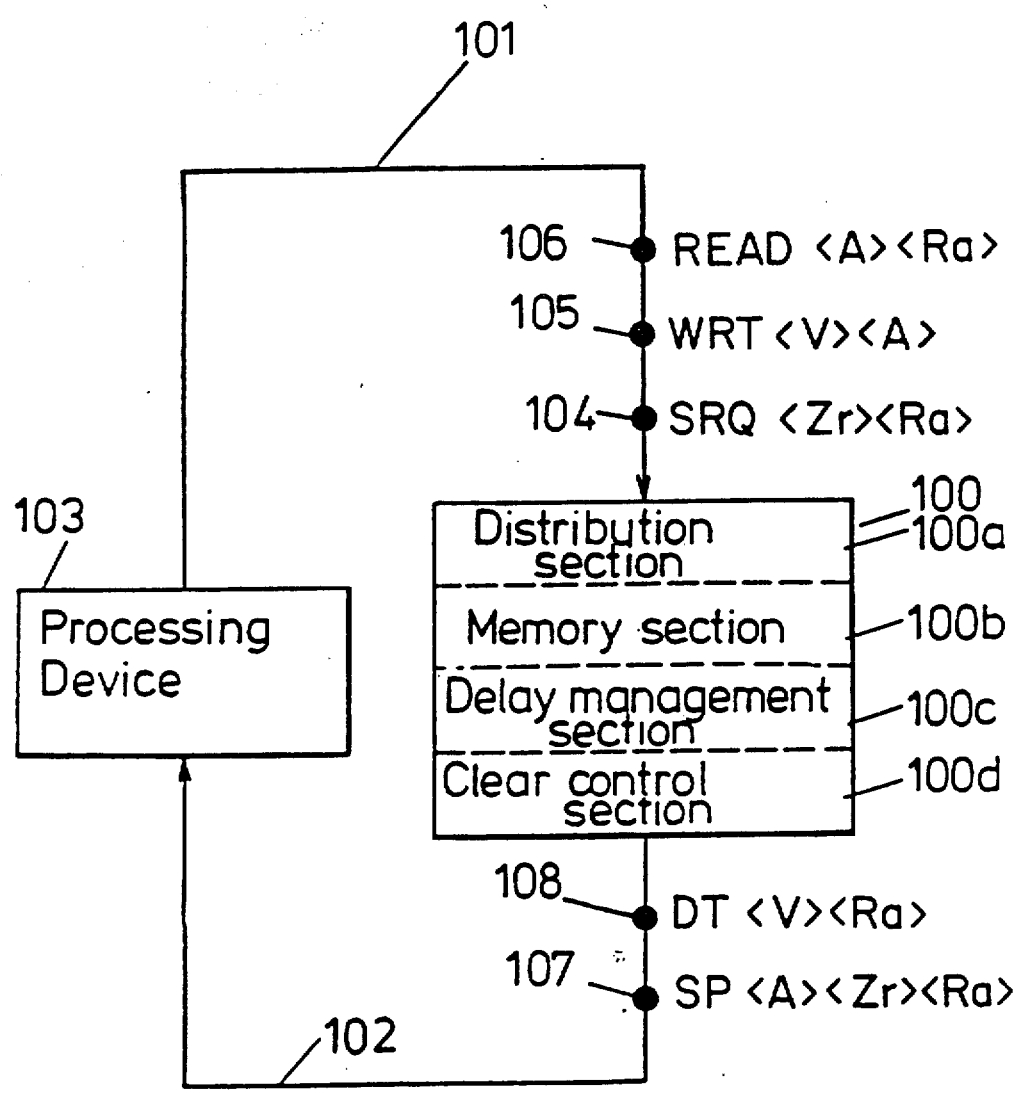
FIG. 1a is a block diagram of a prior art delay management device.
Figure 5:
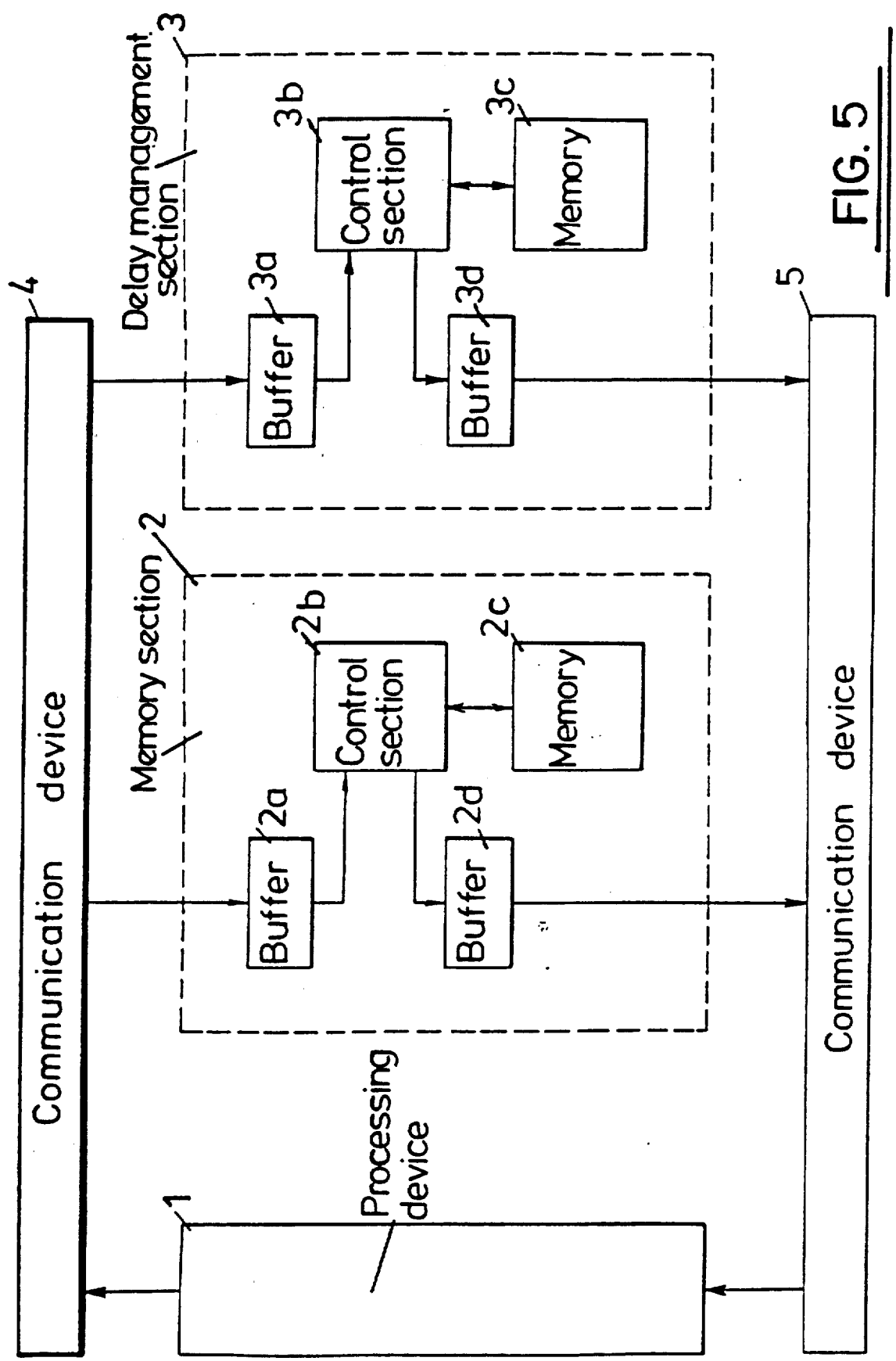
FIG. 5 is a block diagram of a delay management device embodying the present invention.

Referring to FIG. 5, numeral 1 designates a processing device, which corresponds to the processing device 103 of FIG. 1. Numerals 2 and 3 denote a memory section and a delay management section which correspond to the memory section 100b and the delay management section 100c of FIG. 1 respectively. Numerals 4 and 5 are communications devices which collect and deliver tokens which are passed between the operating device 1, the memory section 2, and the delay management section 3, and correspond to channels 101 and 102 of FIG. 1.

The memory section 2 comprises a buffer 2a which maintains temporarily tokens which are received from communications device 4. A control section 2b is provided in which the nature of received tokens is analysed and, depending on the type of token received, either stores the token parameters in memory 2c, or reads out the contents of memory 2c. A buffer 2d serves the purpose of sending tokens which emanate from control section 2b to the communications device 5.

In delay management section 3, a buffer 3a temporarily stores tokens received from communications device 4. A control section 3b analyses tokens received and, depending on their type, either stores their parameters in a memory 3c or reads the contents of the memory 3c. A buffer 3d sends to the communications device 5 tokens which emanate from the control section 3b.

Figure 6:
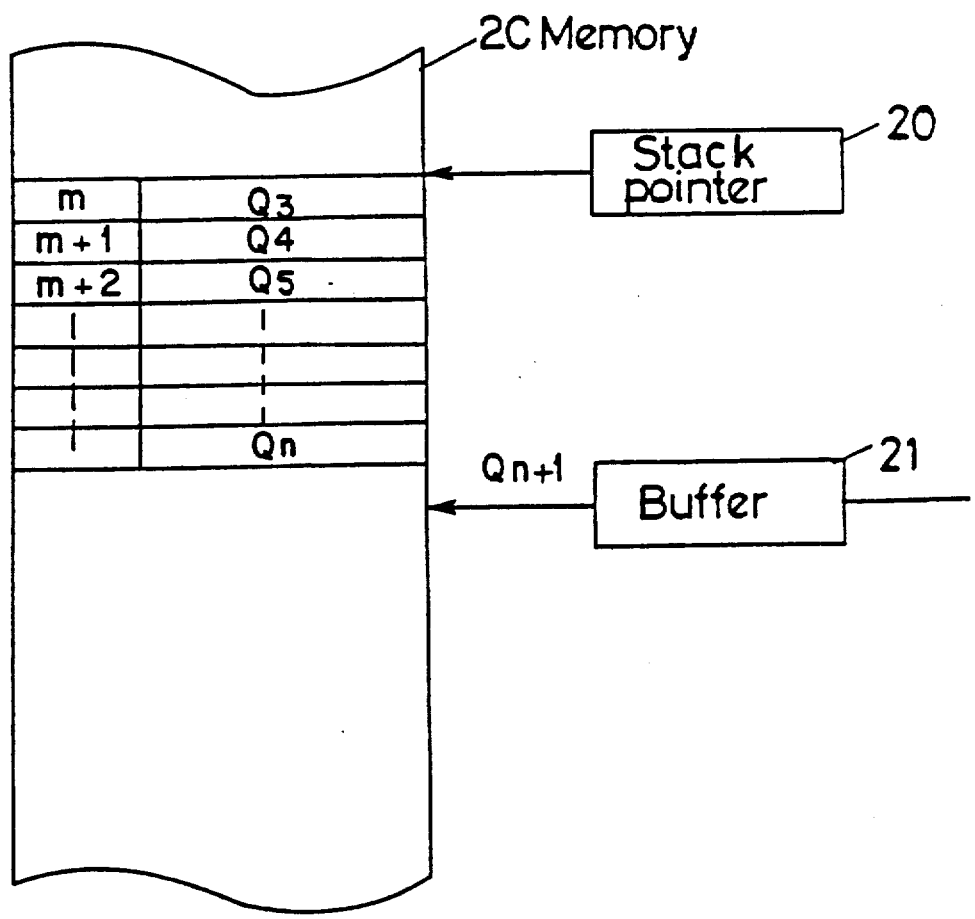
FIG. 6 is a block diagram illustrating elements of the device of FIG. 1.

Referring to FIG. 6, the essential parts of the control section 2b and the memory section 2c will be explained. FIG. 6 shows a part of the space in the memory 2c. In the space are already stored the free addresses in memory 3c (in FIG. 5), for example Q3, Q4, Q5...... Qn. The free address space of memory 3c is identified by stack pointer 20. A buffer 21 communicates the address Qn+1 of a free address space of memory 3c which has been released by the delay management device 3, and these free addresses are accumulated.

Figure 2A:
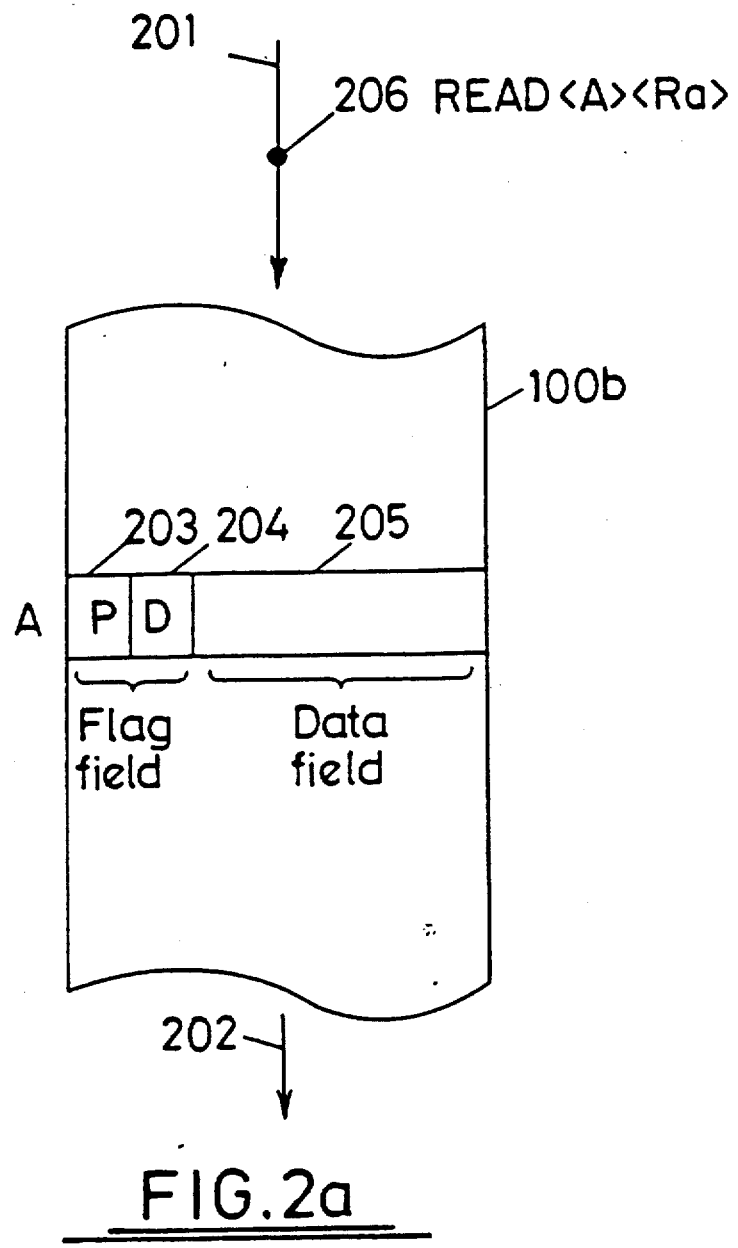
FIGS. 2a to 2c, 3a and 3b, and 4a to 4f are schematic diagrams illustrating the operation of the prior art delay management device.
Figure 2B:
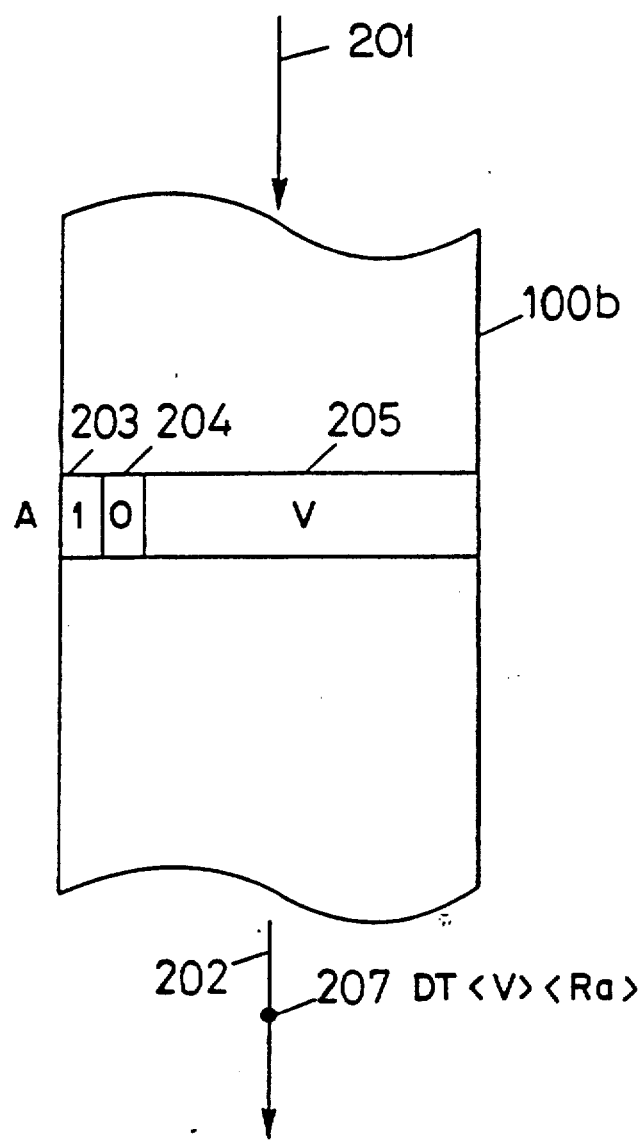
Figure 2C:
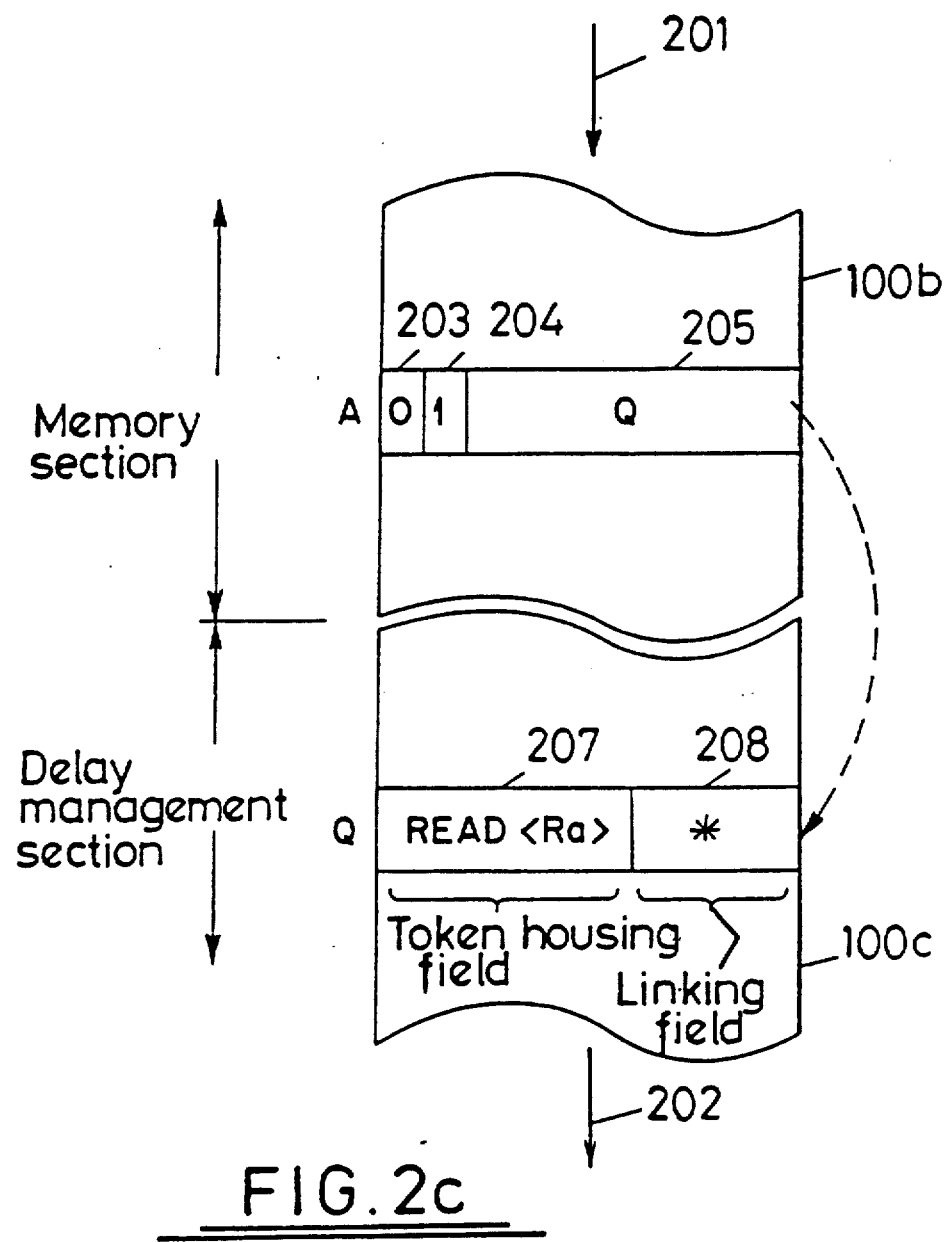
Figure 7A:
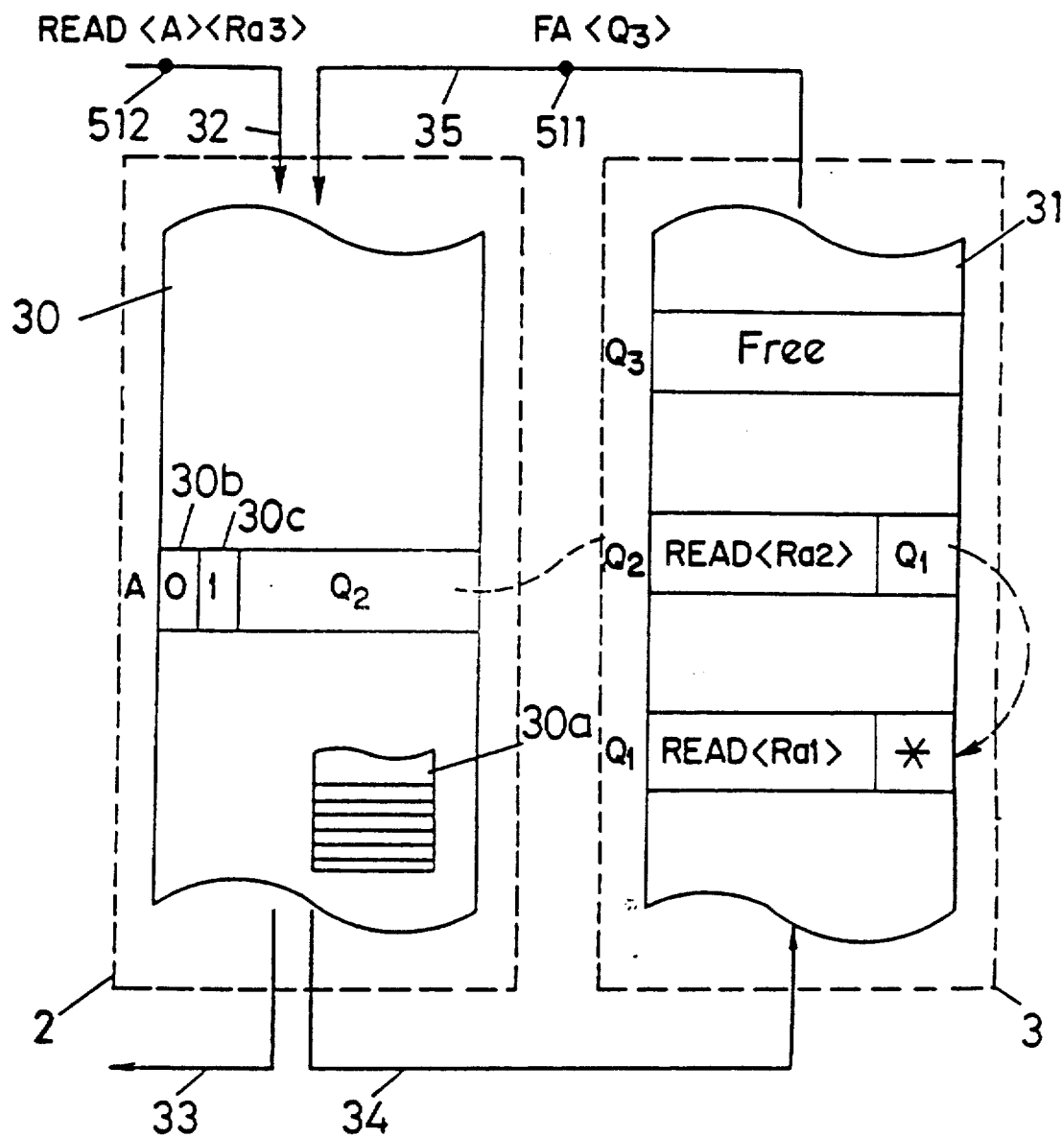
FIGS. 7a to 7j are schematic diagrams illustrating the operation of a delay management device embodying the invention.

The delay management method of the present invention will now be described. FIGS. 5 and 6 just show an outline of one example of the present invention, and the present invention is not limited for example to the buffer 2a and 2d and the control section 2b in the memory section 2. The essence of the present invention can more easily be understood by explaining the workings of the invention with reference to FIGS. 7a to 7j. Referring to FIG. 7a, numeral 30 represents memory space in the memory 2c of memory section 2, and 30a represents a memory section in which the free address space of memory 3c (shown in FIG. 6) is stored. Numerals 30b and 30c represent valid and delay flags which correspond to those shown in FIG. 2a, and numeral 31 represents a memory space in the memory 3c of delay management device 3. Numerals 32, 33, 34 and 35 identify channels along which tokens are sent, and they correspond to the collection and delivery devices 4 and 5 of FIG. 5.

The workings of the delay management device shown in FIGS. 5 and 6 will now be described with reference to FIGS. 7a to 7j.

Figure 4A:
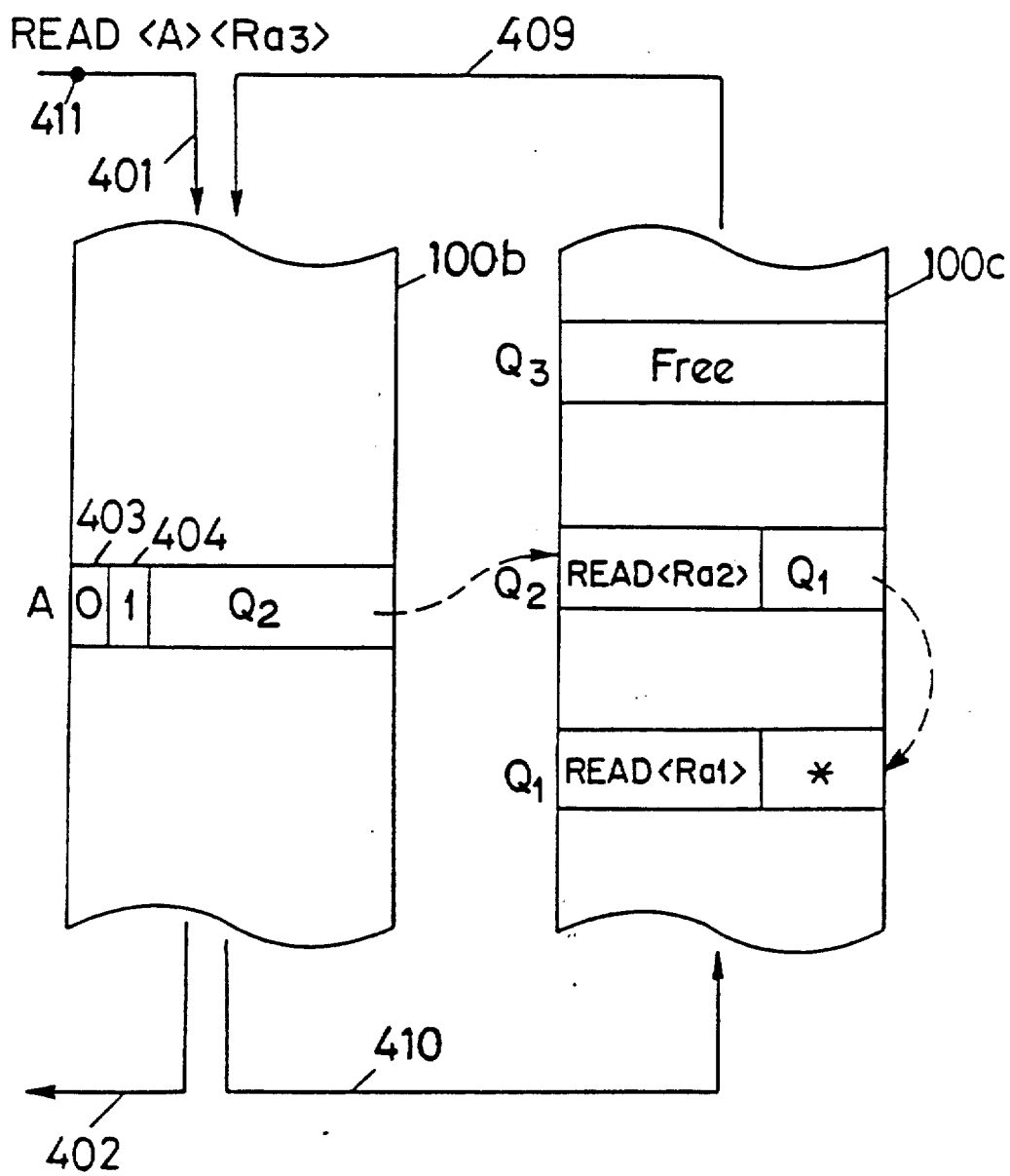

Referring to FIG. 7a, in the example shown, as in FIG. 4a, two read request tokens relating to address A of memory section 2 have already been delayed, and a new read request token 512 has arrived in the memory section 2. A token (FA) 511 is sent containing a free address available in delay management section 3, and stored in the memory section 30a of the memory section 2. So the free address token 511 carries the free address in delay management section 3 as a parameter and stores it in address housing section 30a.

Figure 7B:
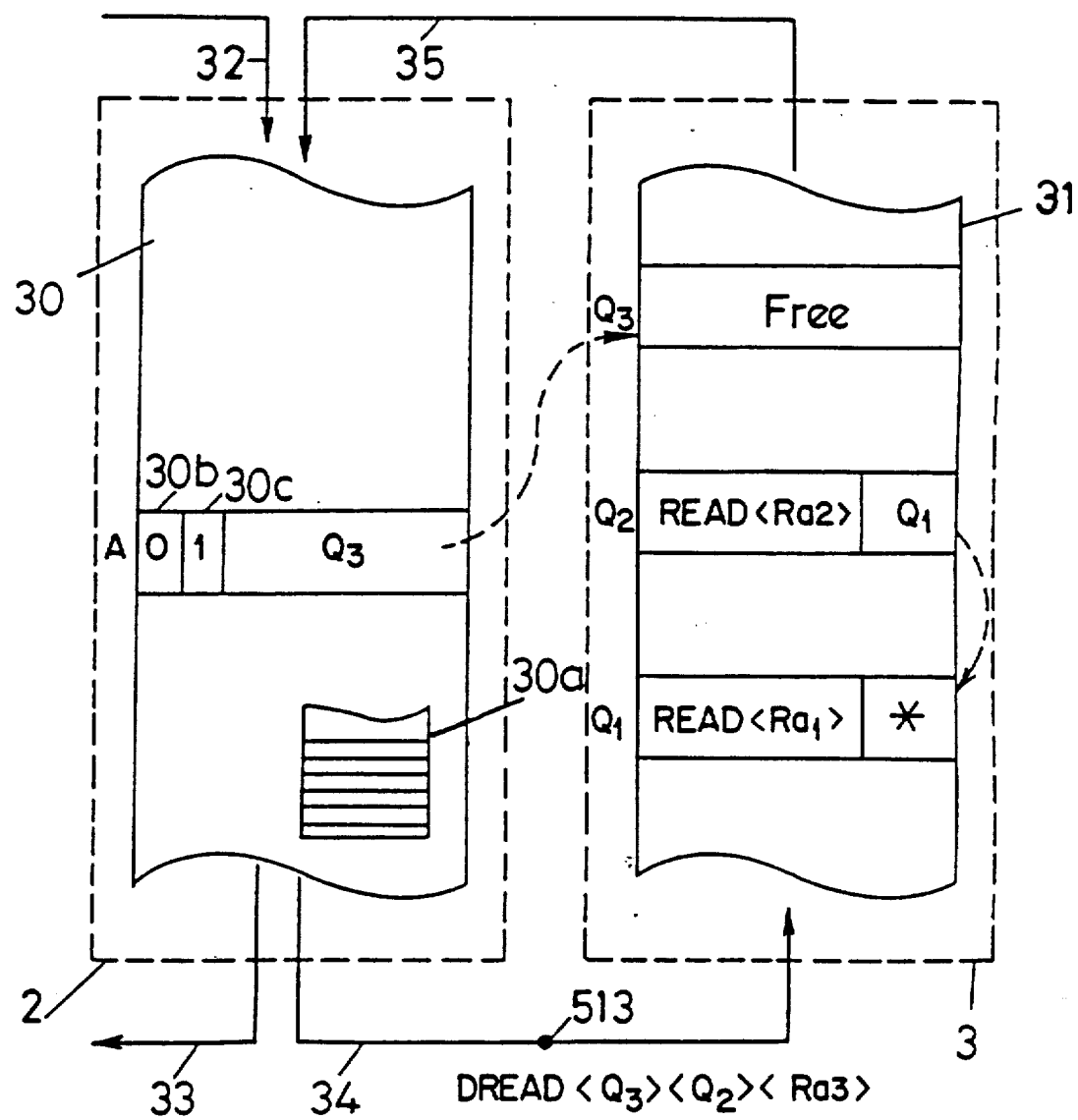

(1) When memory section 2 receives both the free address token 511 and the read request token 512, and the existing flag 30b is "0", as shown in FIG. 7b the read request token 512 is changed into a delay token (DREAD) 513, and the delay token 513 is sent to the delay management section 3. The address parameter (A) is deleted from the read request token 512 and the value Q2 which is in address A and the parameter Q3 which is held in the free address token 511 are combined into delay token 513. Then the free address Q3 is stored in address A, and the free address Q3 is cancelled from memory section 30a.

(2) When the delay token 513 arrives at the delay management section 3, it is stored at free address Q3. The address (Q3) at which it is stored is determined by the parameter Q3 which is contained in token 513. This happens even if for example another address such as Q2 is free when token 513 arrives. The parameter Q2 is housed in address Q3. The initial delay management process is then complete.

Figure 4B:
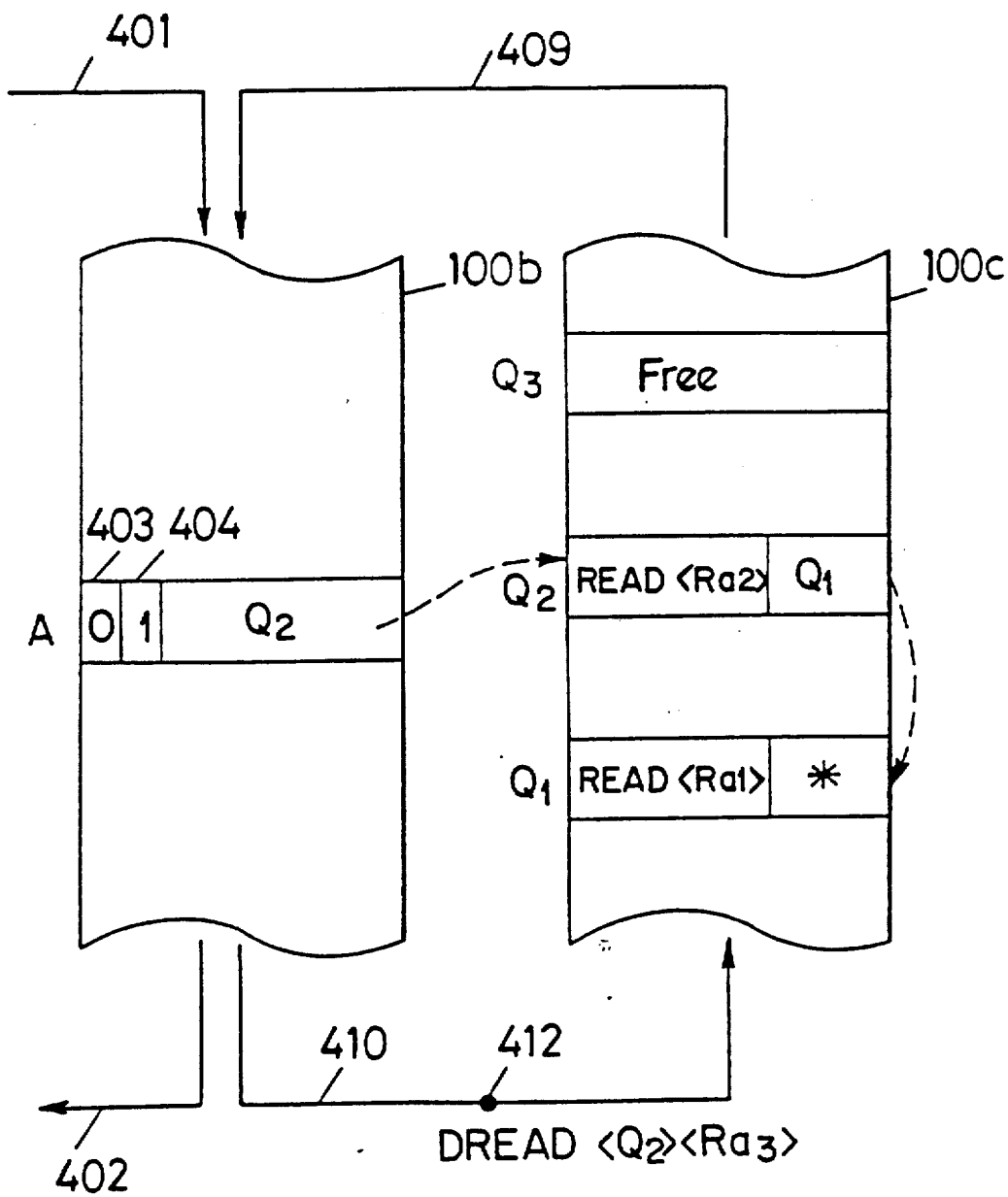
Figure 4C:
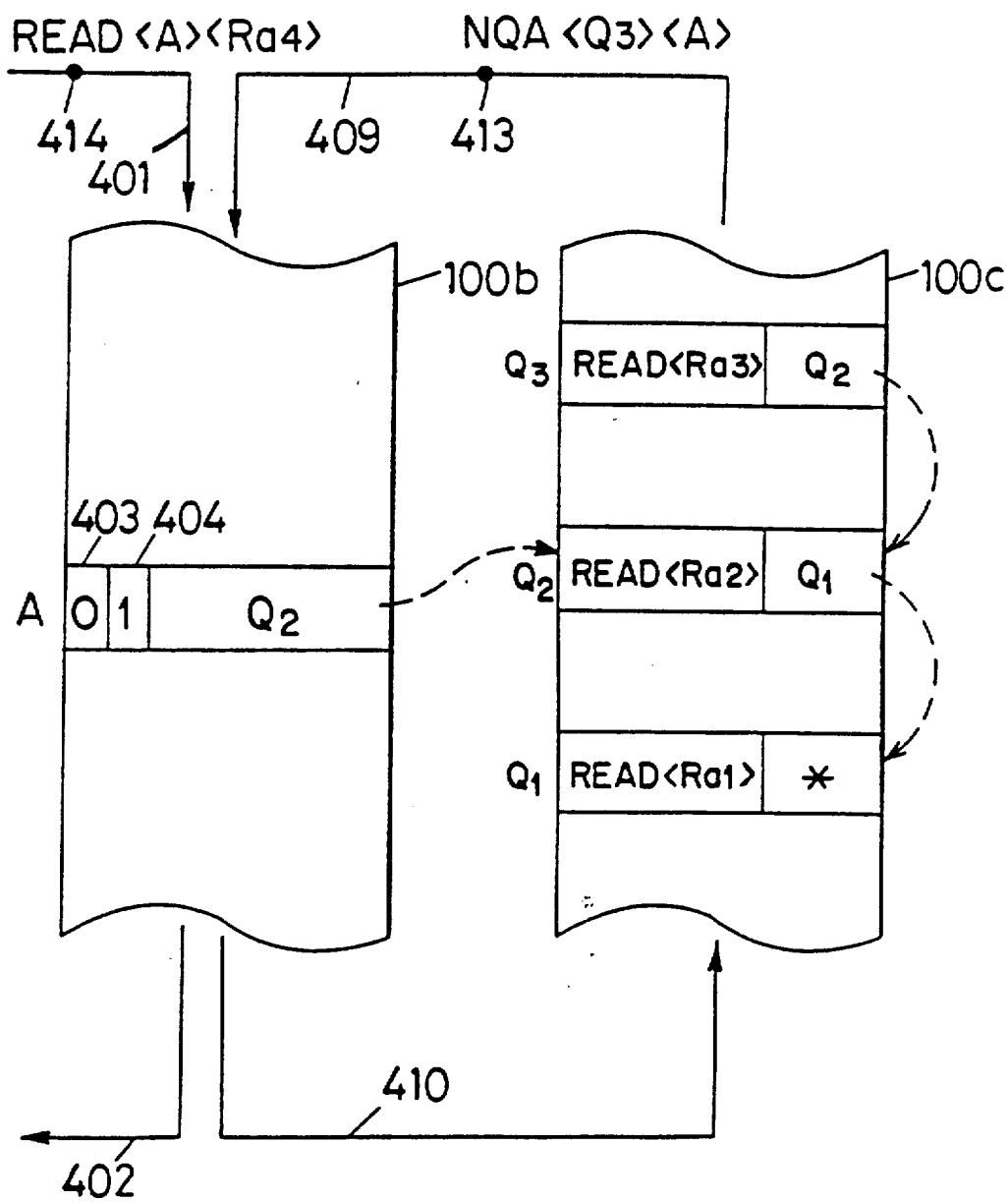
Figure 4D:
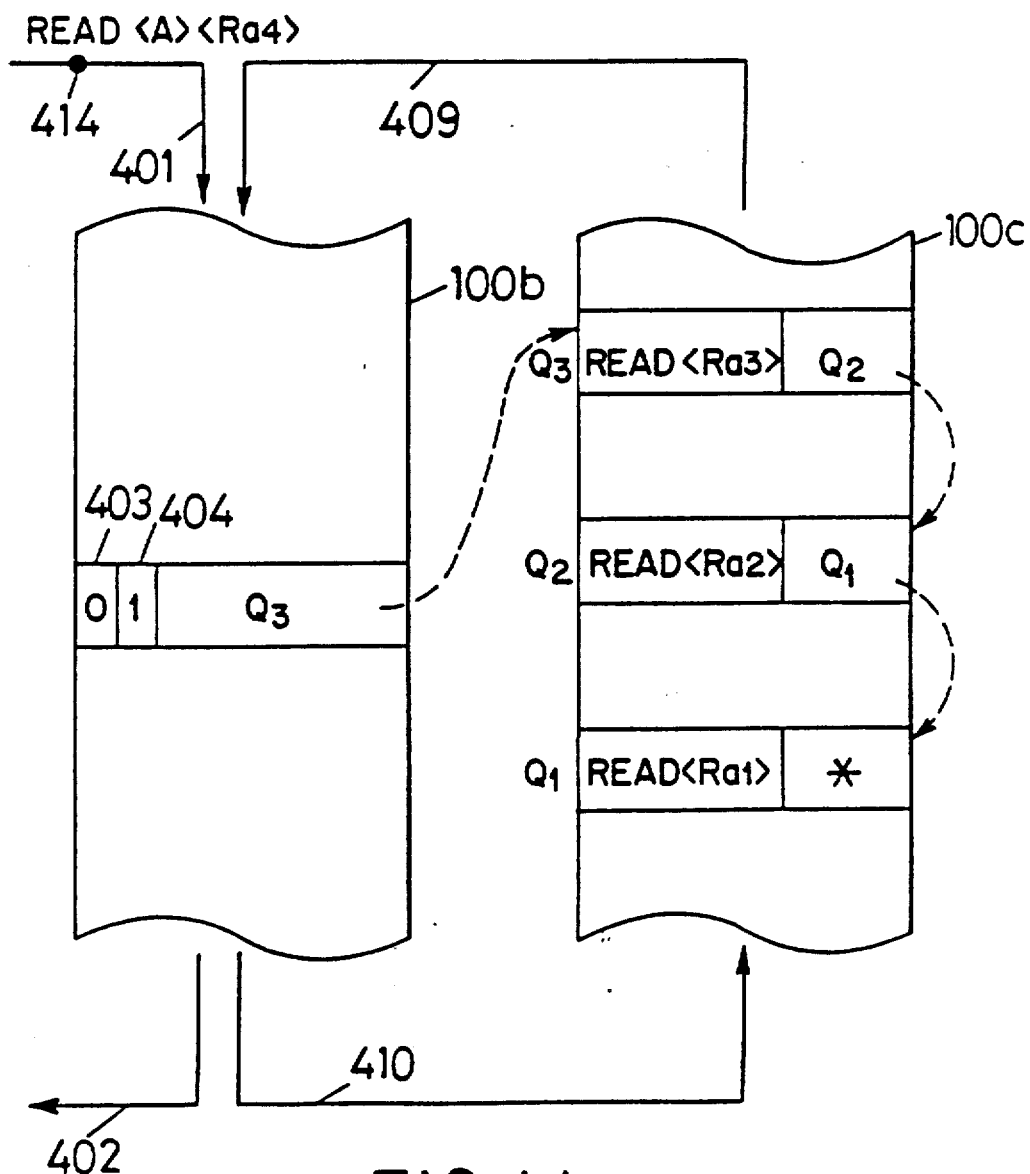
Figure 4E:
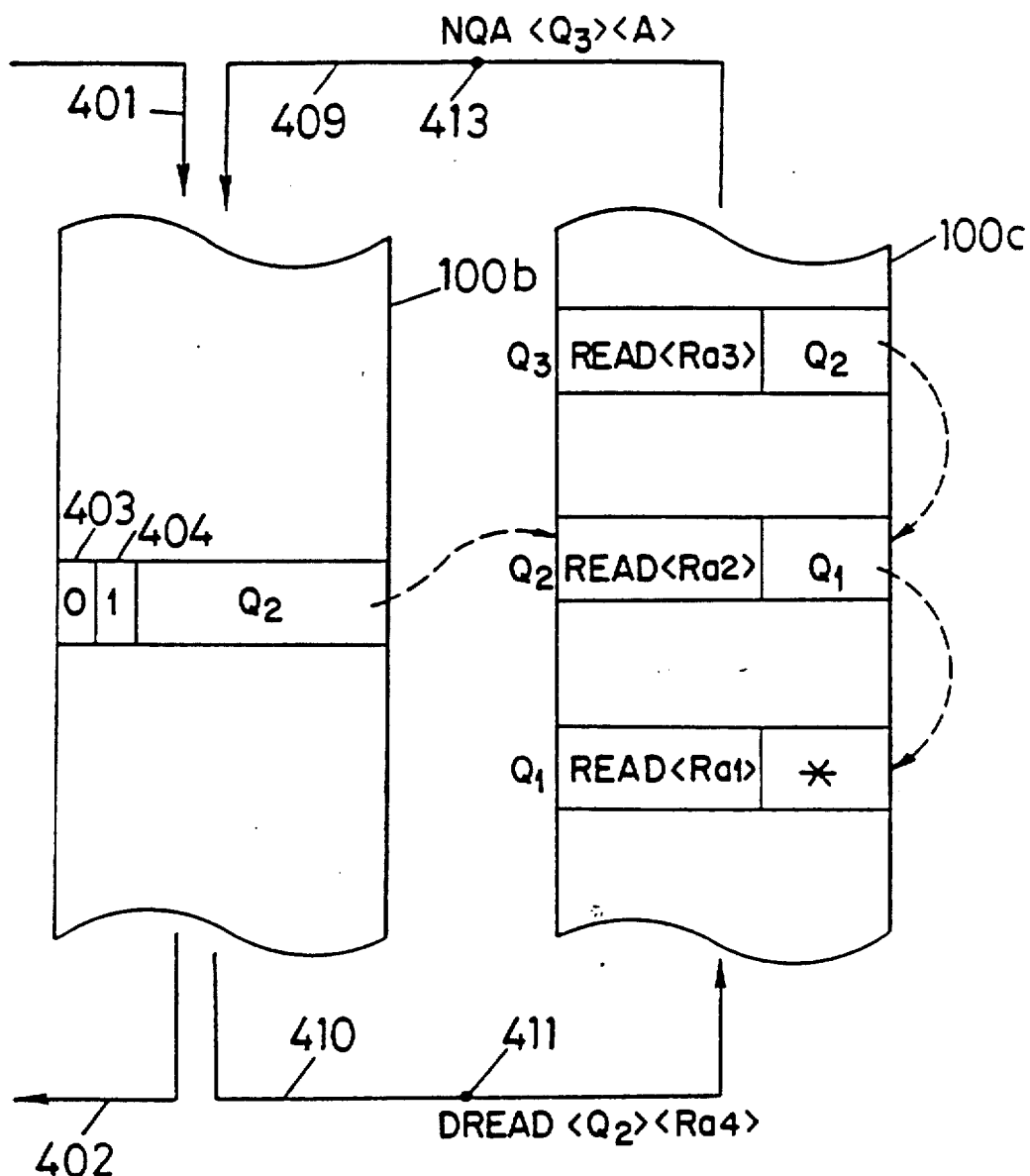
Figure 7C:
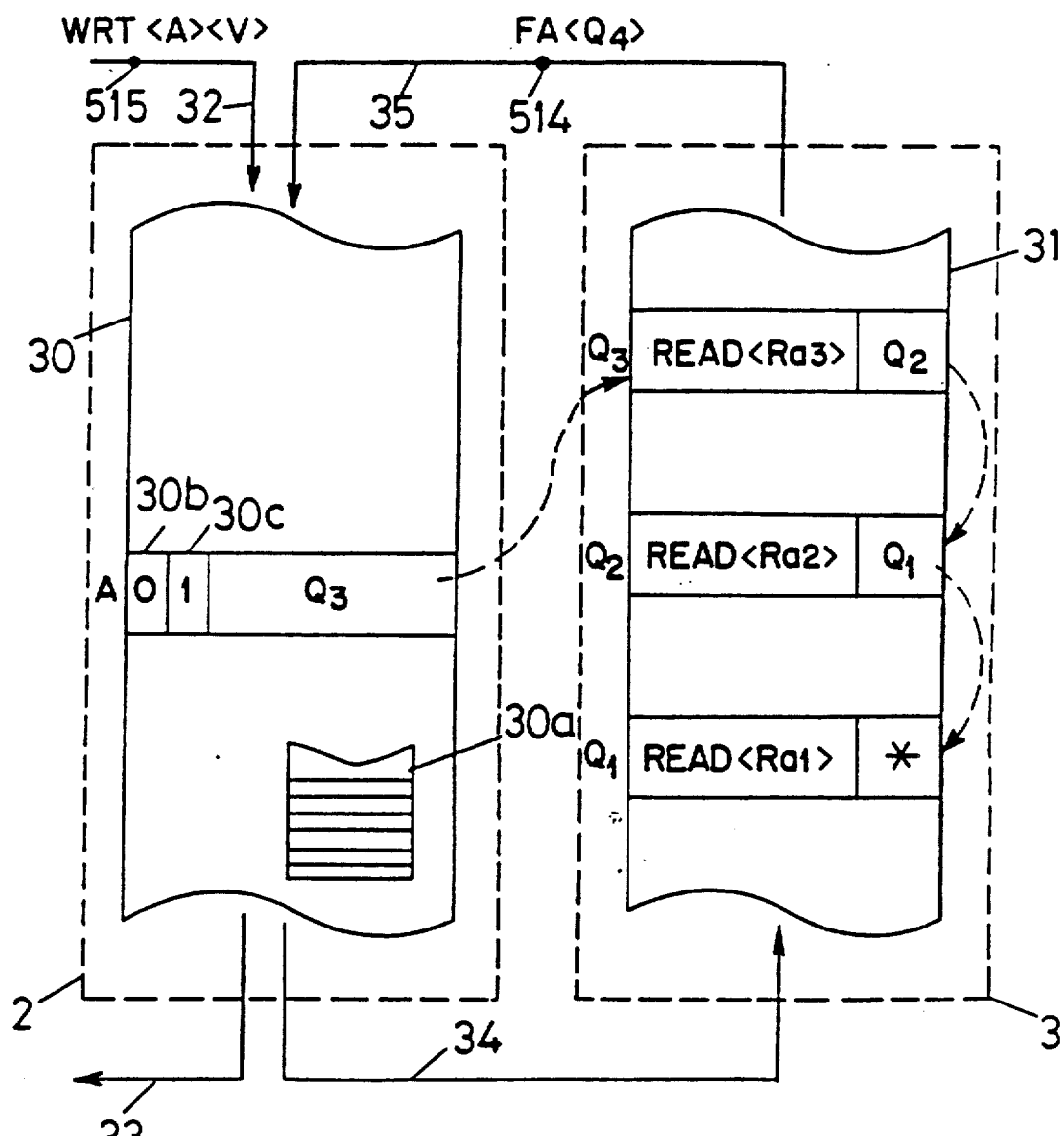
Figure 7D:
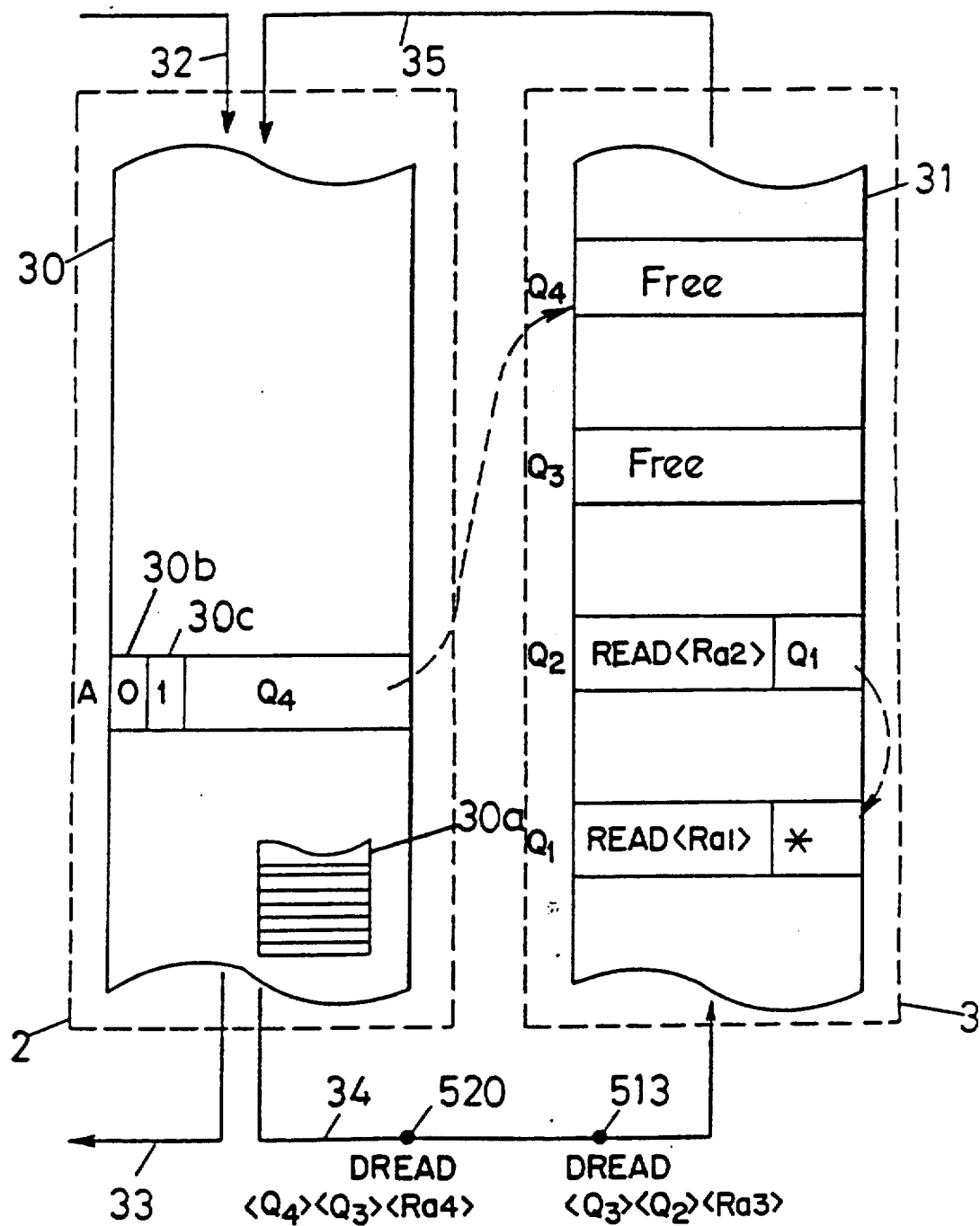
Figure 7E:
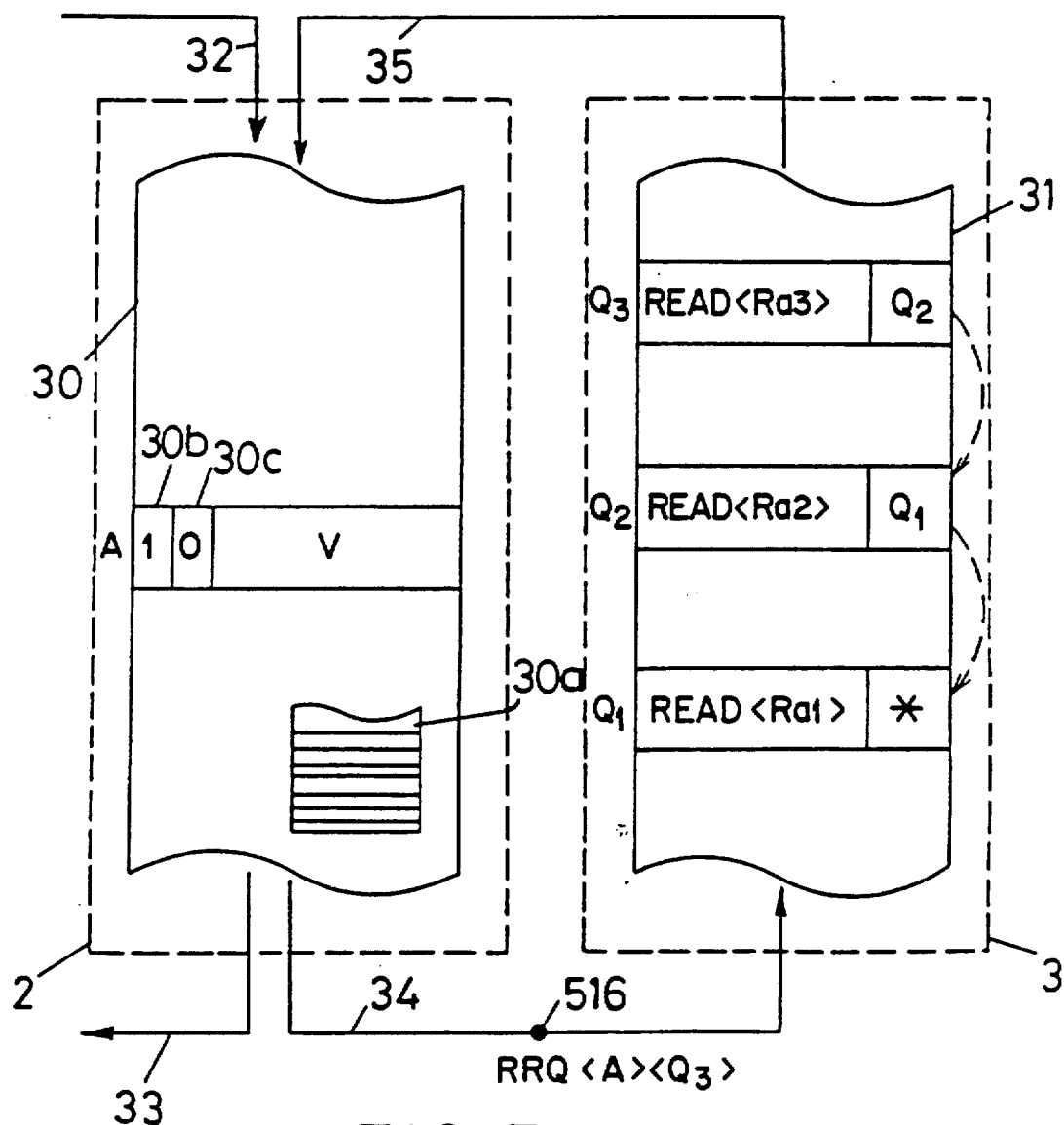
Figure 7F:
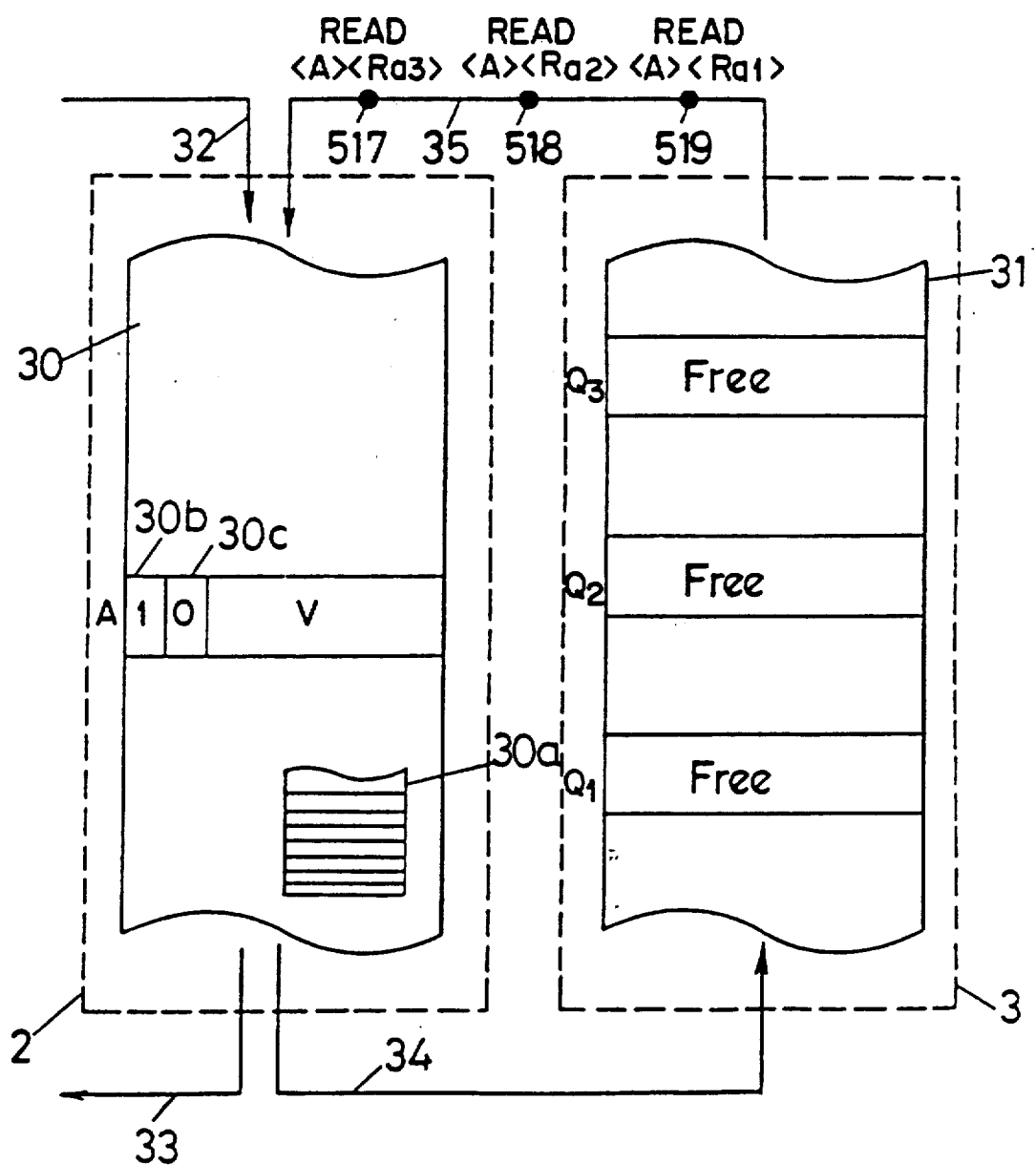

(3) The store 30a of free addresses is replenished by the delay management section 3 giving rise to a free address token 514 which is sent to the address section 30a of memory section 2 (see FIG. 7c). With the above mentioned arrangement the problems described with reference to FIGS. 4a and 4b do not arise. That is to say that, even in the kind of conditions shown in FIG. 7d, in which the delay token 513 has not yet reached the delay management section 3 the memory section 2 can once again delay a read request token related to address A. For example, in FIG. 7d, if a fresh token delay occurs it should have the parameters <Q4> <Q3> <RA4> as shown for the token 520. Q4 is the free address which is available within the delay management section 3, and is stored in the address section 30a in the memory 2. When the token 520 arrives at the delay management section 3, data is stored at address Q4. Even supposing that the token 520 overtakes the token 513 of FIG. 7d and arrives first, the order of the chain of stored delay tokens does not change and the usual chain forms once the token 513 has arrived and as a result data has been stored at address Q3. Referring to FIGS. 7e and 7f, when a write token WRT which relates to address A arrives, the delay token or tokens which relate to address A are released, and the procedure is as described hereinbelow.

(4) When the memory 2 receives the write token, it looks at delay flag 30c, and because the value of this is "1" it determines that the address (in delay management section 3) of a delay token is stored in address A. As a result, at the same time as entering the data V to address A, the release request (RRQ) token 516 is generated. Then, when the existing flag 30b is "1", the delay flag 30c is set to "0".

(5) Referring to FIG. 7e, the release request (RRQ) token 516 has address A and the address Q3 housed therein as its parameters, and it is sent to delay management section 3.

(6) When the delay management section 3 receives the release request token 516, it recognises from the parameter Q3 the first of the series of delay tokens which should be released, and from the parameter A the address to which the tokens to be released relate. As a result the series of read tokens 517 to 519 is generated and sent to the memory section 2. Then each of the addresses in which the delay tokens have been stored in the delay management section 3 becomes a free address.

(7) When memory section 2 receives the tokens 517 to 519, it reads data from the address A and sends the read data V in a data token to the operation device.

Figure 1B:
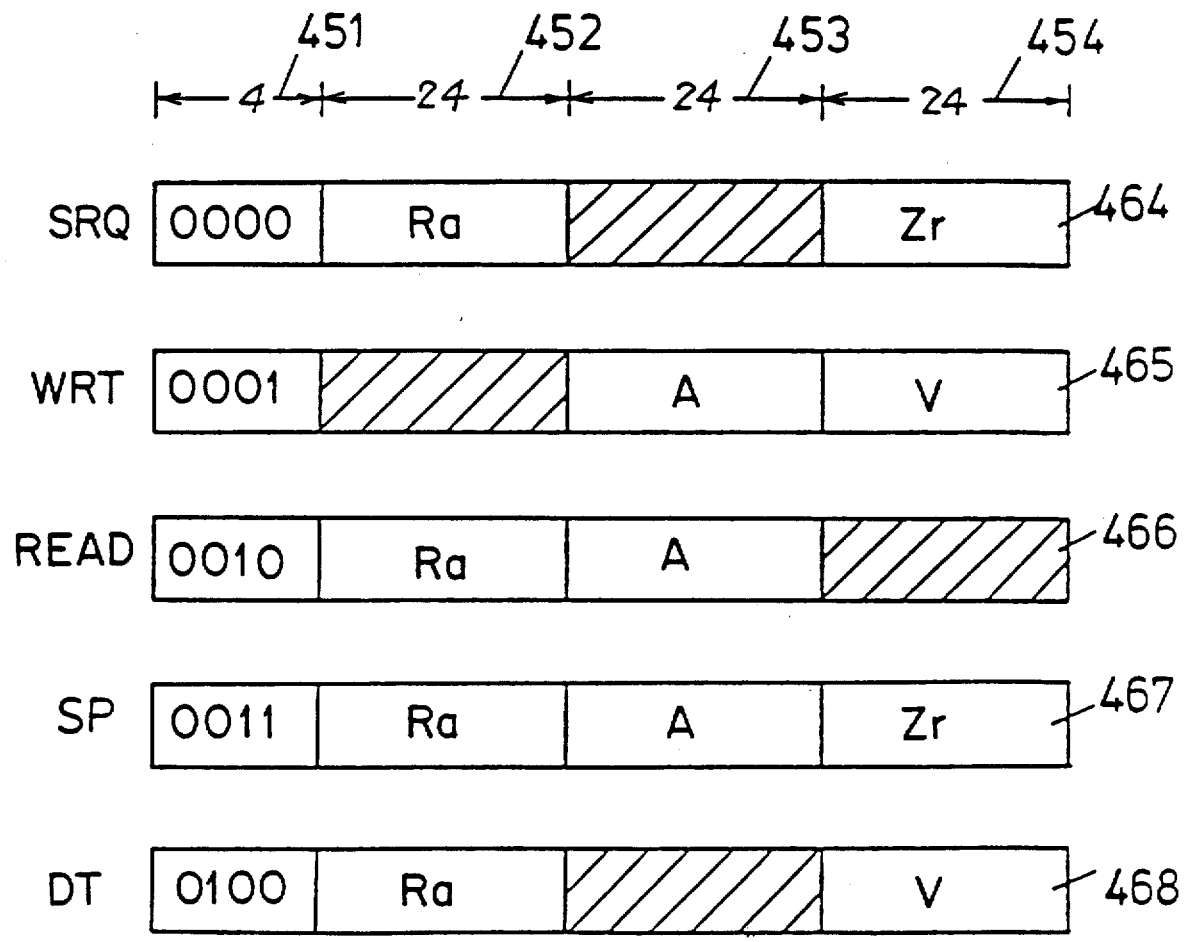

The tokens READ and WRT shown in FIGS. 7a to 7f have the same forms as READ and WRT in FIG. 1b respectively.

Figure 7G:
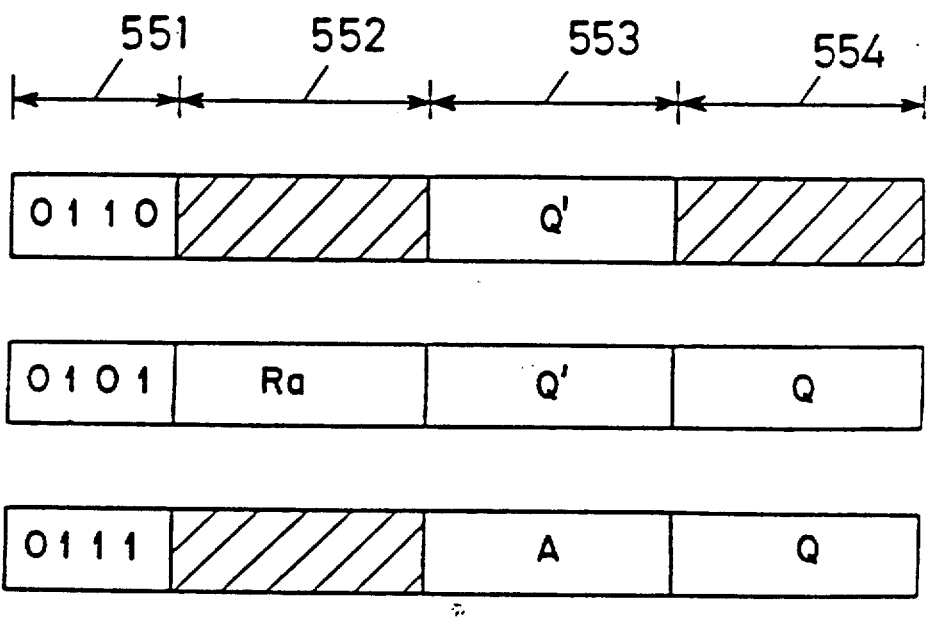

Examples of the form of the tokens DREAD, FA and RRQ as used in FIGS. 7a to 7f are shown in FIG. 7g (the shaded section of the drawing are fields which are not used). In the same diagrams, 551 to 554 correspond to 451 to 454 respectively, in FIG. 1b.

Figure 4F:
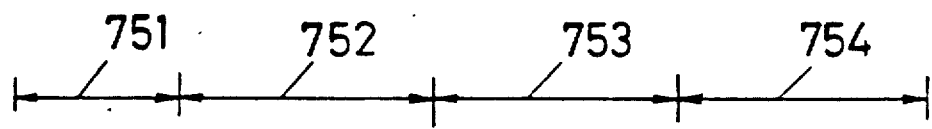
Figure 4F:
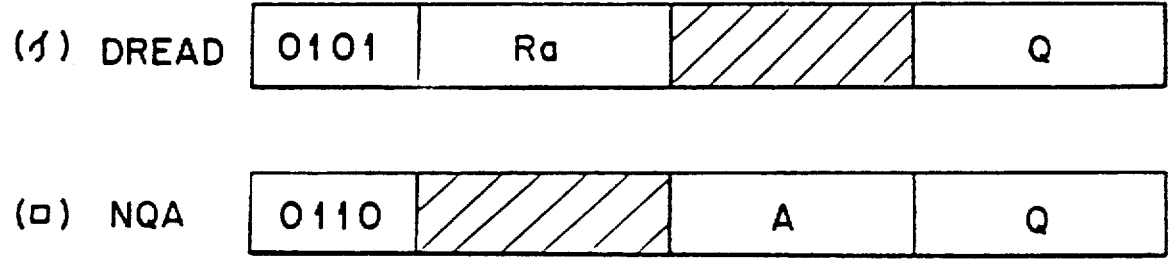

DREAD in FIG. 7g is not the same as it is in FIG. 4f; one more field is used. FA corresponds to NQA in FIG. 4f except that one less field is used.

As mentioned above, since the tokens 517, 519 released from the delay management device 3 have the same form as they did before the delay, there is no need to determine their origin in memory 2. In FIG. 7a the purpose of which is to simplify the explanation, free address token 511 has arrived in the address store section 30a of the memory section 2 at the same time as the read request token 512, and it is all right for more than one free address token to accumulate in the store section 30a of the memory section 2.

In this situation, every time the delay processing section 3 receives a delay token, if it sends a free address token to the memory section 2 the accumulation of the free word tokens in the memory section 2 is maintained.

The situation can arise in which tokens overtake each other in the token channels 32, 33, 34 and 35. For example, taking the example of the situation in FIG. 7h, in which a write token has been sent from the processing device, the resultant action will be explained with reference to FIGS. 7h to 7j. In FIGS. 7h to 7j, 31a is a valid flag which is associated with each address in the delay processing section 30. The purpose of the flag 31a is to show if the address holds a delay token, or if it is free.

Figure 7H:
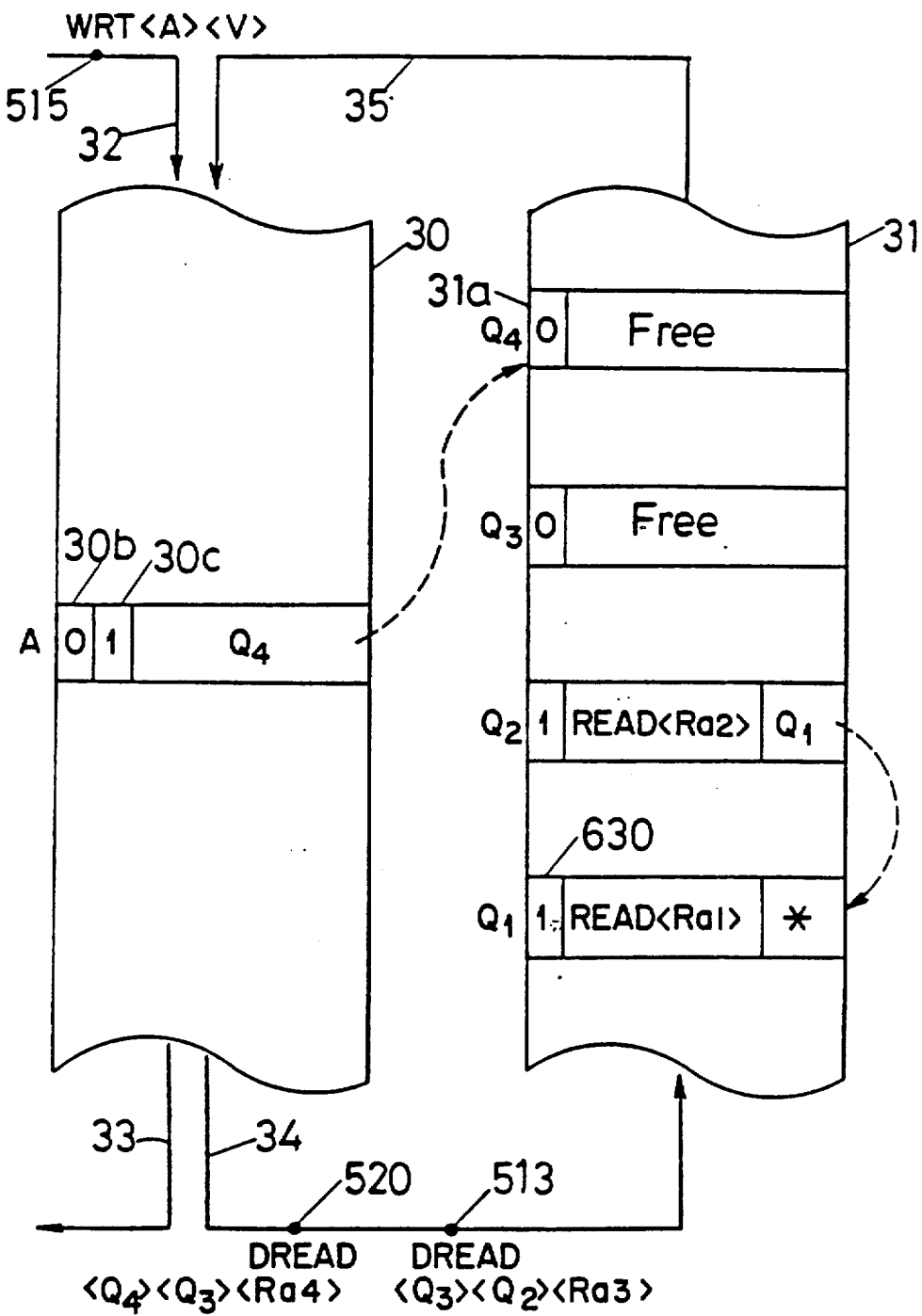
Figure 7I:
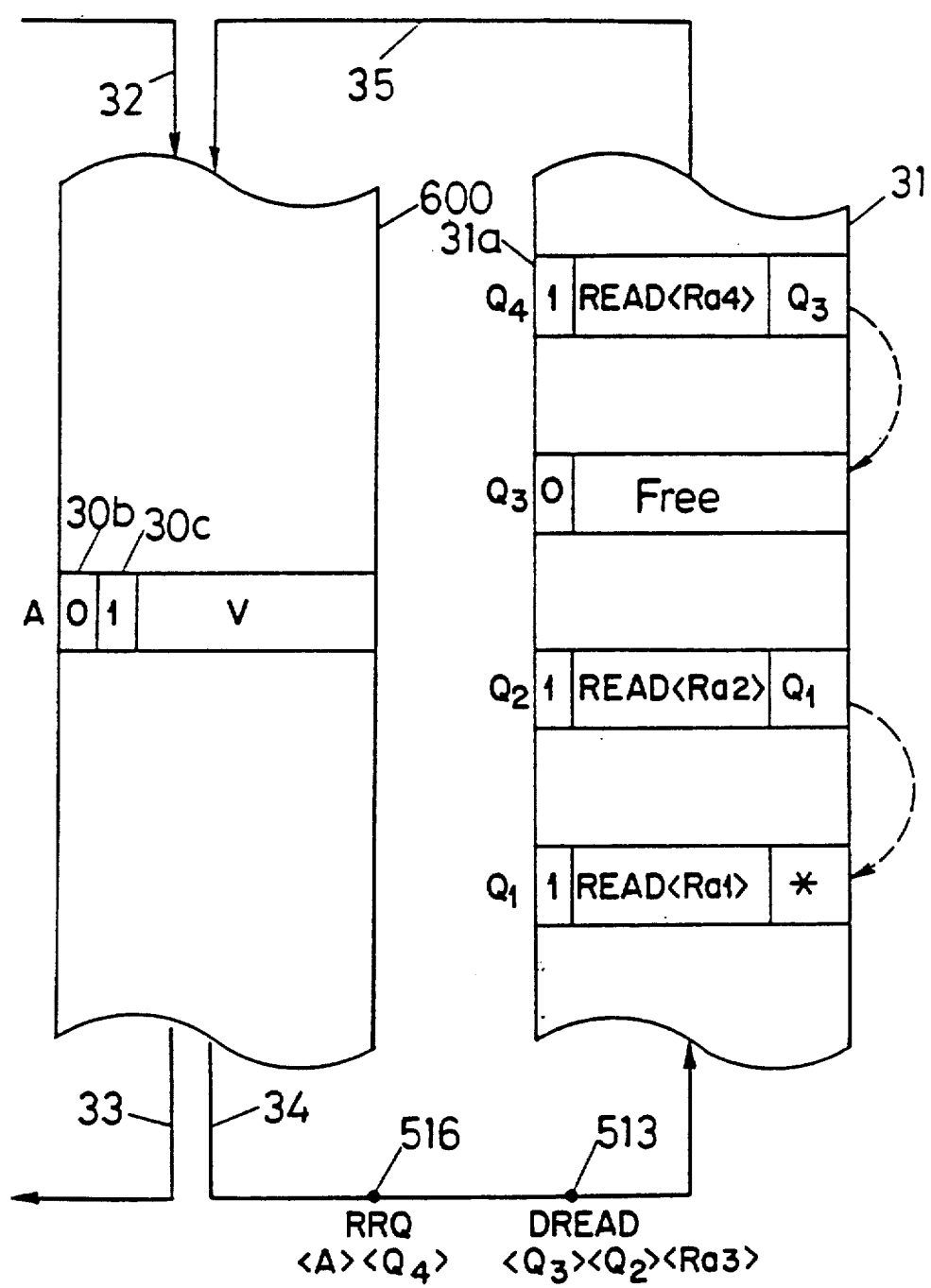

Referring to FIG. 7h, two delay tokens 513 and 520 are in the channel 34 and there is a write token 515 in the channel 32. The memory section 2 receives the write token 515, and processes it. The delay token 520 overtakes the delay token 513, and arrives at the delay processing section 3 first and is processed. The result of this is as shown in FIG. 7i. A "1" is entered in valid flag 31a of address Q4. The memory section 2 then receives the write token 515, and investigates the address A. Since there is a token which has been delayed with relation to this address, a release token 516 is generated. The release token 516 comprises as parameters the address A and the delay address Q4 which has been held in address A. Furthermore, the value V is entered in the address A. However, although the delay token 520 has arrived in the delay processing section 3, and the parameters Q3 and Ra4 have been stored in the delay address Q4, so that the series field of the address Q4 indicates the free address Q3, the address Q3 is still free as the token 513 has not yet been received. Thus, if one delay token overtakes another, the series can be broken.

Figure 3A:
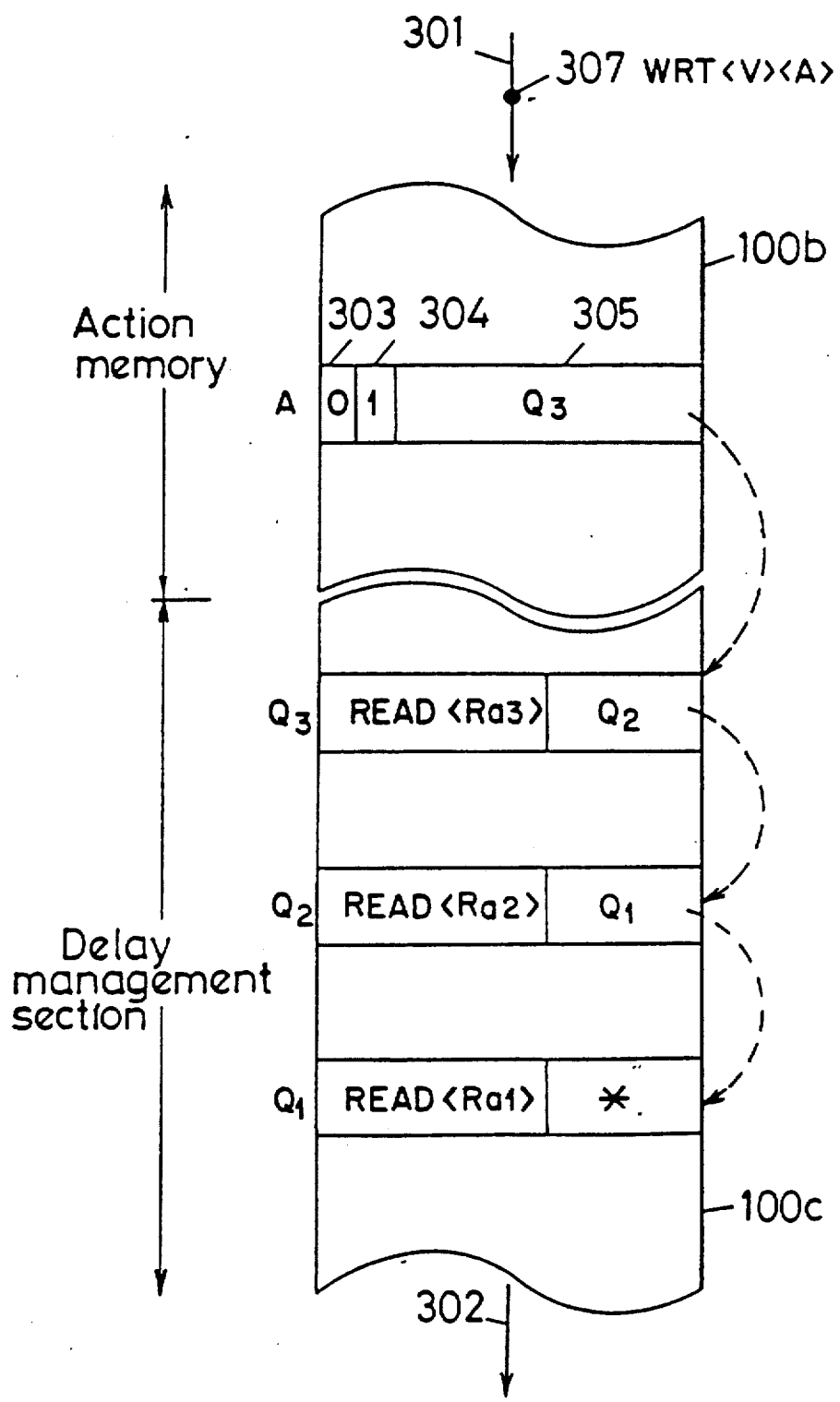
Figure 3B:
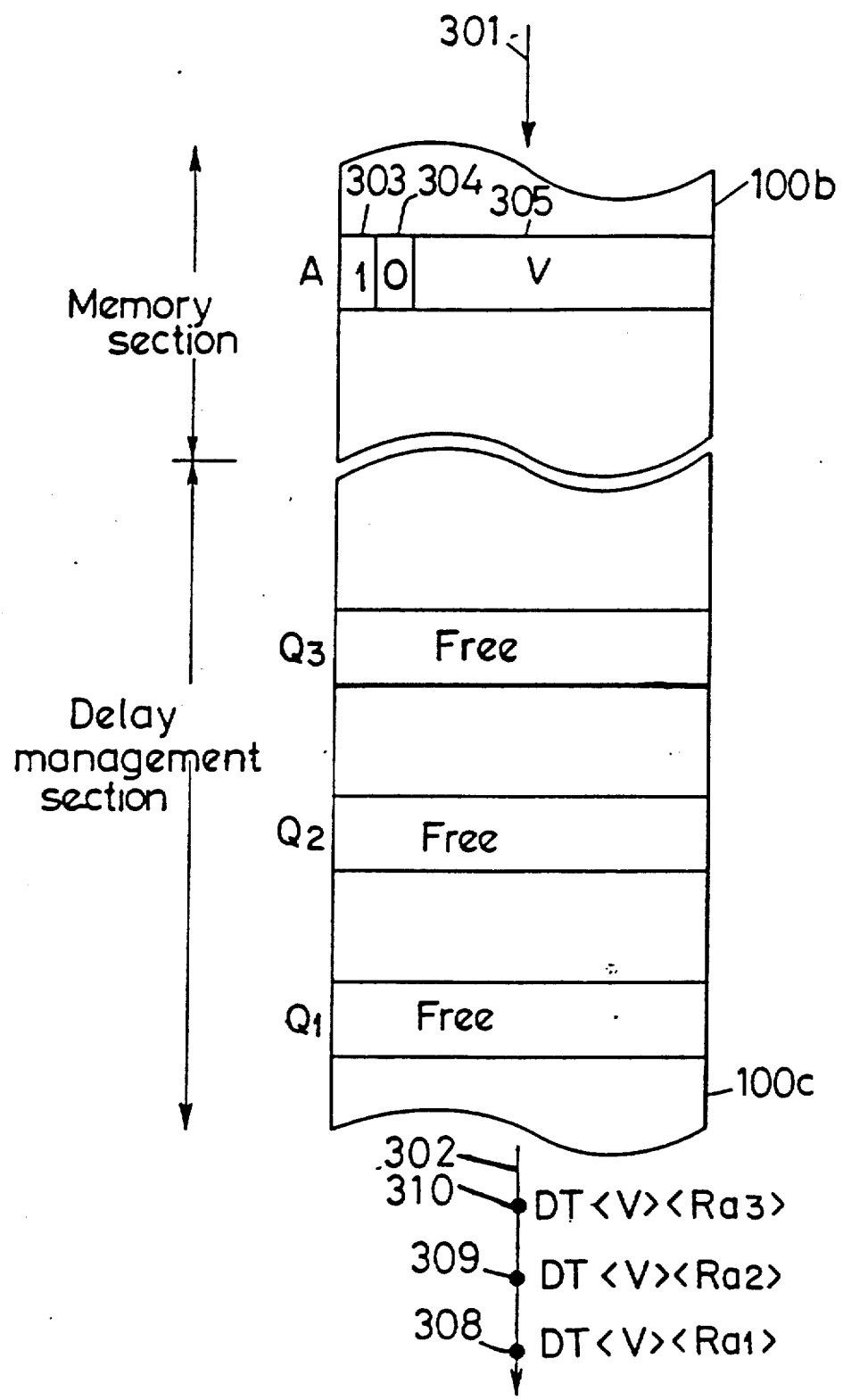
Figure 7J:
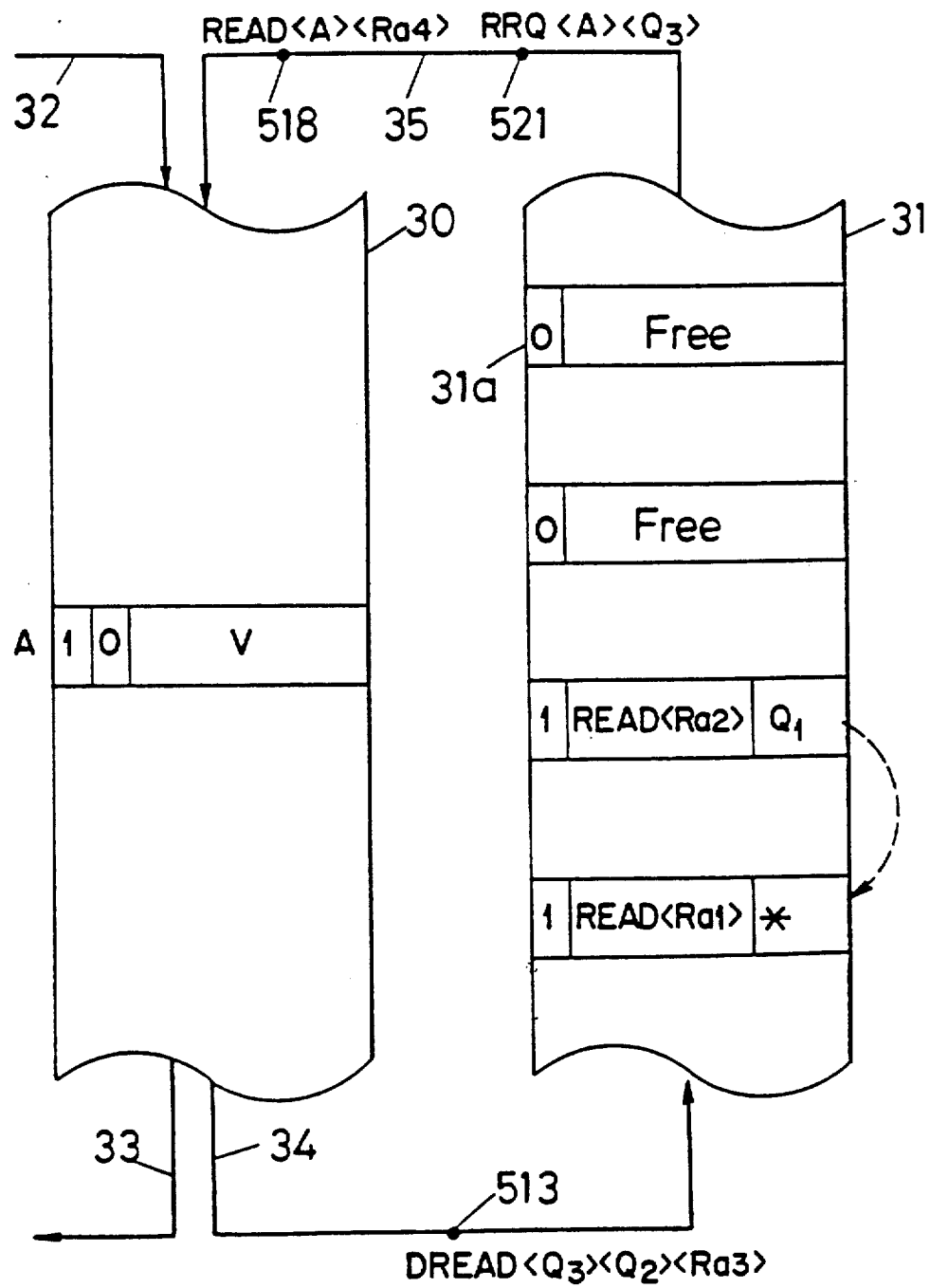

In the situation shown in FIG. 7i, the release request token 516 may overtake the delay token 513, and when it has arrived at the delay processing section 3, it prompts the release of the broken delay series. The action of the delay section 3 to deal with such circumstances is as follows:

The delay processing section 3 reads the address Q4, which indicates the delay address parameter held in the release request token 516, and since the valid flag in this is "1" it joins the address parameter A in the memory section 2 to the parameter Ra4 which it holds, reverts the read request token back to its original state, and sends it out as the read token 518 of FIG. 7j. Next it reads the delay address Q3 which is identified by the series field of the delay address Q4, and reviews the valid flag of address Q3. Since this flag is "0" and therefore the data necessary to generate a Read token is not yet available in address Q3, a new release request token RRQ is generated which has the release address parameter Q3, and is sent out as a release request token 521 as shown in FIG. 3j. The release request token 521 passes through the memory section 2 without undergoing any processing, and is passed via channel 34 back to the delay processing section 3. If in this time the delay token 513 has arrived at the delay processing section 3, it is stored at address Q3 to complete the series, and all the delay tokens of the series are then released. If the second release request token 521 overtakes the delay token 513, the delay processing section 3 makes another release request token which has the same parameters as the release requirement token 521. Whatever happens, until the delay token 513 arrives in the delay processing section 3 and is processed, the above release request process is repeated, until finally all the tokens in the series are released.

To sum up, when the delay processing section 3 receives a release request token, it reads the delay address of that token, and then proceeds as follows:

(a)

It investigates whether or not the valid flag of the address is "1", and if it is "1" it follows the procedure (b) below, and if it is "0", it follows the procedure (c) below.

(b)

The delay processing section joins the memory section address parameter held by the release request token to the parameter held by the address, and generates a read request token READ identical to the token which was originally delayed. The generated read request is sent out, and then the delay processing section read the address which is identified by the series field of that address, and follows the procedure (a) above for that address.

(c)

The delay processing section generates a new release request token including the address which has the valid flag "0" as the delay address parameter. The generated release request is then recirculated until the valid flag contains "1".

By controlling the action of the delay processing section 3 as described above, even if overtaking of tokens occurs in the token channels, it is possible to correctly release the delay tokens.

Thus, in accordance with the present invention, when a read request relating to data which has not yet been received by a memory device is attempted, the read request is delayed and information which is essential for carrying out this read request is stored in a delay management device. When the data to be read has arrived, the invention is constructed so that the read request can then be carried out. Therefore the above-mentioned memory device and delay management device can be distinguished from each other, and even in situations where communication between the two is only done by token packets, the two devices can operate without problems arising.

The free addresses of the above-mentioned delay management device are allowed to accumulate in the above-mentioned memory device. When a read request is to be delayed, a free address at which a delay token is to be stored is stored in the address to be read. The delay token is then sent to the delay management device, the delay token including the free address token from the store in the memory device. By storing the above-mentioned delay tokens, and releasing them with the address in the above-mentioned memory device which is to be read, the delay management and the maintenance of coherent information can be controlled simply and without contradiction.

Furthermore, even when one token overtakes another which relates to an earlier delayed read request, it is possible to release delay tokens in series simply and without contradictions by allocating a valid flag to each delay token and repeating a delay token release request until the valid flag indicates that the associated delay token has been received.

I claim:

1. A delay management method for a computer system comprising a processing device, a memory section including a main memory and a free address memory, means for transmitting write instructions from the processing device to the memory section, each of the write instructions including an item of data and identifying an address of the main memory into which the item of data is to be written, means for transmitting read instruction from the processing device to the memory section, each of the read instructions identifying an address of the main memory from which an item of data is to be read out to the processing device, and a delay management section including a delay management memory for delaying premature read instructions which identify addresses of the main memory into which the item of data to be read out has not yet been written, the method comprising the steps of:

(a) transmitting, from the delay management section to the memory section, free address data including address identifiers identifying free addresses in the delay management memory, (b) storing the free address identifiers in the free address memory, (c) detecting premature read instructions with detecting means and storing, at the address of the main memory identified by a detected premature read instruction, an identifier of an address of the delay management memory selected from the address identifiers stored in the free address memory, (d) deleting the selected address identifier from the free address memory, (e) generating a delay token with delay token generating means when a premature read instruction is detected, the delay token including the selected address identifier and information identifying the detected premature read instruction and any previously selected delay management memory address identifier replaced by the selected address identifier in the address of the main memory identified by the detected premature read instruction, (f) transmitting the delay token from the memory section to the delay management section, (g) storing, at the address identified by the selected address identifier included in a delay token, the identifying information included in the delay token, whereby the stored identifying information links together any two or more delay management memory addresses storing information related to premature read instructions directed to the same main memory address, (h) generating a release request token with release request token generating means when a write instruction causes an item of data included in the write instruction to replace an identifier of an address of the delay management memory in an address of the main memory identified by the write instruction, the release request token including an identifier of the address into which the item of data is written and the replaced delay management memory address identifier, (i) transmitting the release request token from the release request token generating means to the delay management section, (j) generating read instruction tokens with read instruction token generating means in response to receipt, by the delay management section, of release request token being a read instruction token being generated in respect of the address of the delay management memory for which an identifier is included in the release request token and any the previously selected address linked thereto by the stored information, (k) transmitting the read instruction tokens with read instruction token transmitting means to the memory section to cause the delayed premature read instructions to be executed, and (l) transmitting a free address token from the delay management section to the memory section in respect of each address of the delay management memory from which a read instruction token has been generated.

2. A delay management method according to claim 1, wherein each address of the main memory is flagged to indicate whether or not a data item has been written therein.

3. A delay management method according to claim 1, wherein each address of the main memory is flagged to indicate whether or not a read instruction relating to that address has been delayed.

4. A delay management method according to claim 1, wherein each address of the delay management memory is flagged to indicate whether or not the delay management memory is free.

5. A delay management method according to claim 1, wherein each read instruction token generated by the delay management section includes data which is identical to the delayed read instruction resulting in the generation of that read instruction token.

* * * * *